United States Patent
Lee et al.

(10) Patent No.: US 9,843,632 B2
(45) Date of Patent: *Dec. 12, 2017

(54) METHOD FOR PEER TO PEER GROUP FORMATION IN DIRECT COMMUNICATION SYSTEM AND DEVICE THEREFOR

(71) Applicant: LG ELECTRONICS INC., Seoul (KR)

(72) Inventors: Byungjoo Lee, Anyang-si (KR); Dongcheol Kim, Anyang-si (KR); Jinho Kim, Anyang-si (KR); Wookbong Lee, Anyang-si (KR); Hangyu Cho, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/370,787

(22) Filed: Dec. 6, 2016

(65) Prior Publication Data
US 2017/0085638 A1    Mar. 23, 2017

Related U.S. Application Data

(63) Continuation of application No. 14/421,426, filed as application No. PCT/KR2013/010121 on Nov. 8, 2013, now Pat. No. 9,538,568.
(Continued)

(51) Int. Cl.
*H04W 4/00* (2009.01)
*H04L 29/08* (2006.01)
(Continued)

(52) U.S. Cl.
CPC ...... *H04L 67/1046* (2013.01); *H04L 67/1051* (2013.01); *H04W 4/08* (2013.01);
(Continued)

(58) Field of Classification Search
None
See application file for complete search history.

(56) References Cited

U.S. PATENT DOCUMENTS 9,100,801 B2    8/2015  Jung
2012/0233266 A1  9/2012  Hassan et al.
(Continued)

FOREIGN PATENT DOCUMENTS

EP    2555490    2/2013
EP    2557825    2/2013
(Continued)

OTHER PUBLICATIONS

Wi-Fi Alliance Technical Committee, Wi-Fi Display Technical Task Group, "Wi-Fi Display Technical Specification Version 1.0.0," XP009172467, Aug. 2012, 149 pages.
(Continued)

*Primary Examiner* — Michael J Moore, Jr.
(74) *Attorney, Agent, or Firm* — Lee Hong Degerman Kang Waimey

(57) ABSTRACT

The present invention relates to a wireless communication system, and a method for peer to peer (P2P) group formation is disclosed. To this end, the method for P2P group formation may include transmitting, from a first wireless device to a second wireless device, a provision discovery request frame including connection capabilities of the first wireless device, and receiving, at the first wireless device, from the second wireless device, a provision discovery response frame including connection capabilities of the second wireless device. Here, the connection capabilities may include indicating at least one of: New in order to initiate a new group, Group Owner in order to become a group owner, and Client in order to become a client; and the first wireless device determines the group owner of a P2P group on the
(Continued)

basis of the first connection capability and the second connection capability.

15 Claims, 16 Drawing Sheets

Related U.S. Application Data

(60) Provisional application No. 61/776,789, filed on Mar. 12, 2013, provisional application No. 61/810,729, filed on Apr. 11, 2013.

(51) Int. Cl.

| | | |
|---|---|---|
| *H04W 4/08* | (2009.01) | |
| *H04W 8/00* | (2009.01) | |
| *H04W 76/02* | (2009.01) | |
| *H04W 84/12* | (2009.01) | |
| *H04W 72/04* | (2009.01) | |
| *H04W 84/18* | (2009.01) | |
| *H04W 92/18* | (2009.01) | |

(52) U.S. Cl.
CPC ......... *H04W 8/005* (2013.01); *H04W 72/048* (2013.01); *H04W 76/023* (2013.01); *H04W 84/12* (2013.01); *H04L 67/1044* (2013.01); *H04W 84/18* (2013.01); *H04W 92/18* (2013.01)

(56) References Cited

U.S. PATENT DOCUMENTS

| | | | |
|---|---|---|---|
| 2013/0034023 A1 | 2/2013 | Jung | |
| 2013/0040576 A1 | 2/2013 | Yoon et al. | |
| 2013/0045678 A1 | 2/2013 | Lee | |
| 2013/0065627 A1 | 3/2013 | Jung et al. | |
| 2013/0100855 A1 | 4/2013 | Jung et al. | |
| 2013/0137373 A1 | 5/2013 | Choi et al. | |
| 2013/0170482 A1 | 7/2013 | Jung | |
| 2013/0223280 A1 | 8/2013 | Choi et al. | |
| 2013/0223341 A1 | 8/2013 | Kim et al. | |
| 2013/0336161 A1 | 12/2013 | Jung | |
| 2014/0016507 A1* | 1/2014 | Han ...................... H04W 28/18 370/254 |
| 2014/0044114 A1* | 2/2014 | Lee ...................... H04W 76/023 370/338 |
| 2014/0045422 A1 | 2/2014 | Qi et al. | |
| 2014/0068023 A1 | 3/2014 | Arickan | |
| 2015/0245393 A1 | 8/2015 | Lee et al. | |

FOREIGN PATENT DOCUMENTS

| | | |
|---|---|---|
| JP | 2012186643 | 9/2012 |
| KR | 10-2012-0056533 | 6/2012 |
| KR | 10-2013-0016609 | 2/2013 |
| KR | 10-2013-0019848 | 2/2013 |
| RU | 2010121780 | 12/2011 |
| WO | 2009058494 | 5/2009 |
| WO | 2012/060611 | 5/2012 |

OTHER PUBLICATIONS

European Patent Office Application Serial No. 13877890.7 Search Report dated Jan. 4, 2016, 8 pages.
Wi-Fi Alliance Technical Committee, Wi-Fi Display Technical Task Group, Wi-Fi Display Technical Specification Version 1.0.0, Wi-fi simple config Wi-Fi Alliance Wi-Fi display technical specification, Aug. 24, 2012, p. 33, 86-89 (6 pages).
PCT International Application No. PCT/KR2013/010121, Written Opinion of the International Searching Authority dated Feb. 27, 2014, 13 pages.
Russian Federation Federal Service for Intellectual Property, Patents and Trademarks Application Serial No. 2015116433/08, Office Action dated Sep. 22, 2016, 10 pages.

* cited by examiner

FIG. 6
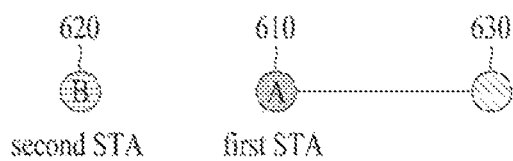
(a)
"A" invited "B"
(b)
● Group Owner  ◐ Group Client  ◌ Not in group
FIG. 7
(a)
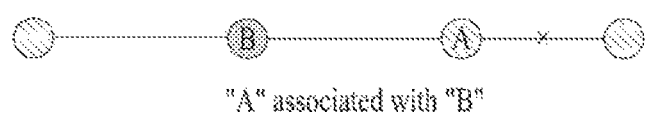
"A" associated with "B"
(b)
● Group Owner  ◐ Group Client  —✕— Link termination FIG. 8
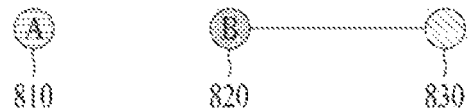
(a)
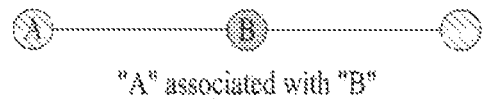
"A" associated with "B"
(b)
● Group Owner   ◎ Group Client   ⊜ Not in group
FIG. 9
(a)
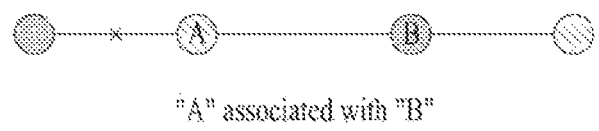
"A" associated with "B"
(b)
● Group Owner   ◎ Group Client   ⇢✗⇢ Link termination

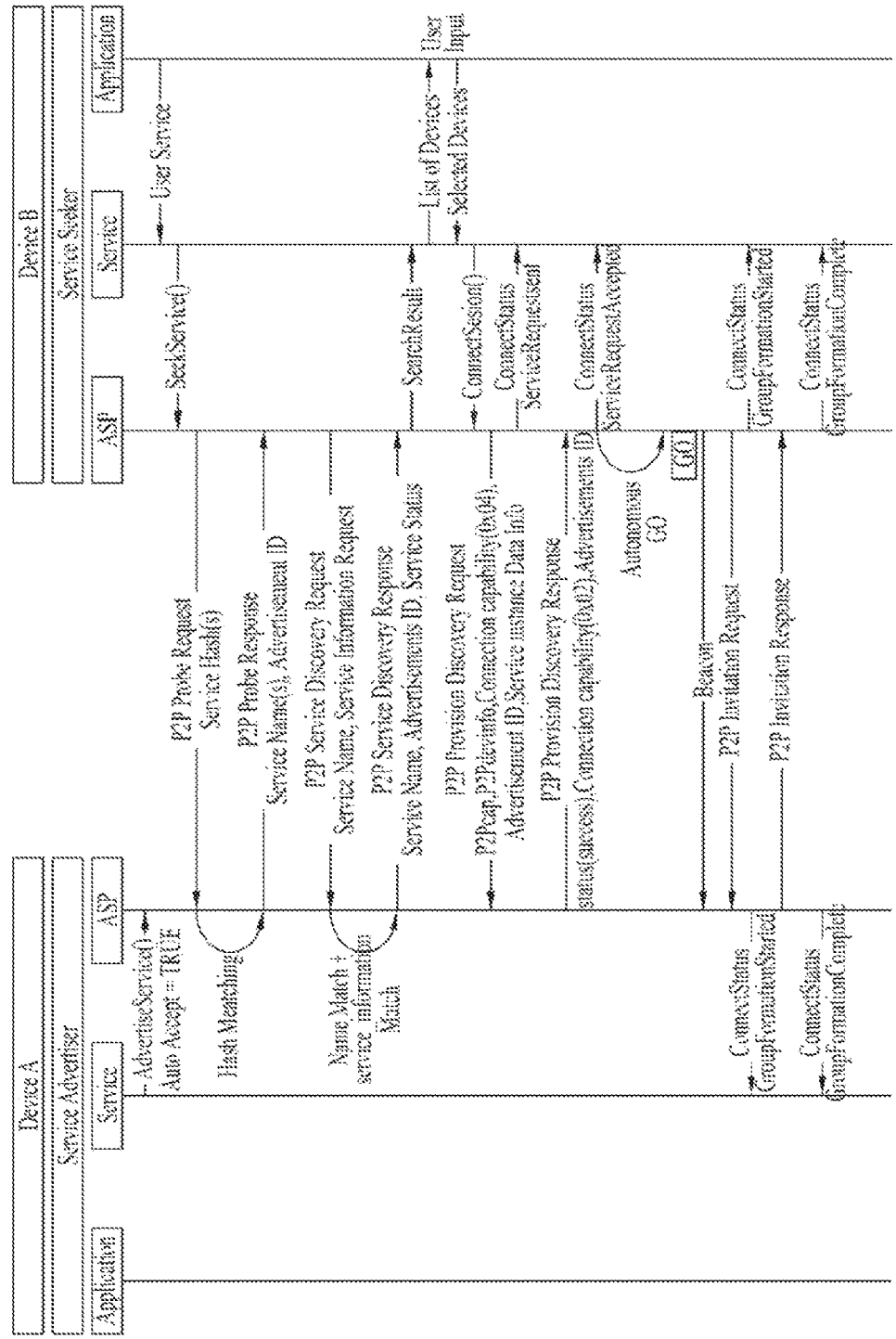

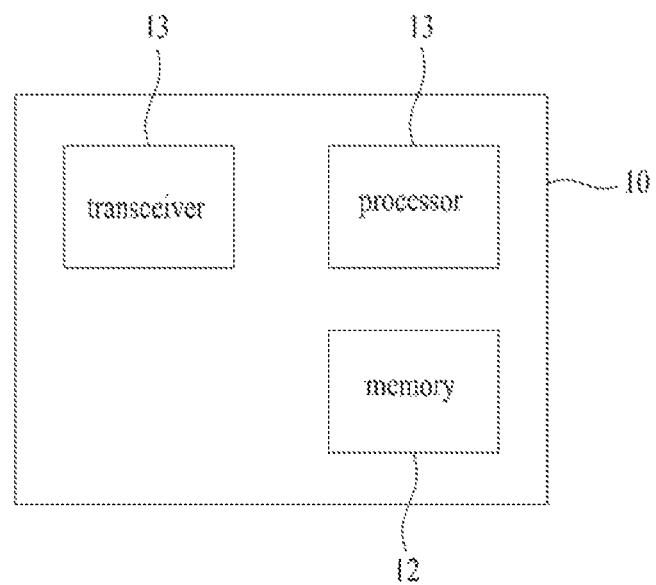

METHOD FOR PEER TO PEER GROUP FORMATION IN DIRECT COMMUNICATION SYSTEM AND DEVICE THEREFOR

CROSS-REFERENCE TO RELATED APPLACTIONS

This application os a continuation of U.S. patent application Ser. No. 14/421,426, filed on Feb. 12, 2015, now U.S. Pat. No. 9,538,568, which is the National Stage filing under 35 U.S.C. 371 of International Application No. PCT/KR2013/010121, filed on Nov. 8, 2013, which claims the benifit of U.S. Provisional Application Nos. 61/776,789, filed on Mar. 8, 2013, and 61/810,729, filed on Apr. 11, 2013, the contents of wich are all hereby incorporated by reference herein in their entirety.

TECHNICAL FIELD

The present invention relates to a wireless communication system, and more particularly, to a method for a peer to peer (P2P) group formation in a direct communication system and a device therefor.

BACKGROUND ART

Recently, with the development of information communication technology, various wireless communication technologies have been developed. Of the technologies, wireless LAN (WLAN) is the technology that allows home or company or a specific service zone to access Internet wirelessly by using a portable terminal such as a personal digital assistant (PDA), a lap top computer, a portable multimedia player (PMP).

As direct communication technology that may allow devices to be easily connected with each other without a radio access point (AP) basically required in a conventional WLAN system, the introduction of Wi-Fi Direct or Wi-Fi peer-to-peer (P2P) has been discussed. According to Wi-Fi Direct, devices may be connected to each other even without a complicated establishment procedure. Also, Wi-Fi Direct may support a mutual operation for data transmission and reception at a communication speed of a general WLAN system to provide users with various services.

Recently, various Wi-Fi support devices have been used. Of the Wi-Fi support devices, the number of Wi-Fi Direct support devices that enable communication between Wi-Fi devices without AP has been increased. In Wi-Fi Alliance (WFA), technology for the introduction of a platform for supporting various services (for example, Send, Play, Display, Print, etc.) using Wi-Fi Direct link has been discussed. This may be referred to as Wi-Fi Direct Service (WFDS). According to the WFDS, applications, services, etc. may be controlled or managed by a service platform called an application service platform (ASP).

DISCLOSURE

Technical Problem

An object of the present invention is to provide a method for peer to peer (P2P) group formation in a WFDS system. More specifically, an object of the present invention is to provide a method for controlling or managing an ASP of a P2P device for P2P group formation.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To solve the aforementioned technical problem, according to one embodiment of the present invention, a method for peer to peer (P2P) group formation in a first wireless device, which supports Wi-Fi Direct service comprises transmitting, via the first wireless device, a provision discovery request frame, which includes connection capabilities of the first wireless device, to a second wireless device; and receiving, via the first wireless device, a provision discovery response frame, which includes connection capabilities of the second wireless device, from the second wireless device. In this case, the connection capabilities may indicate at least one of New for initiating a new P2P group, Group Owner for becoming a group owner, and Client for becoming a client, and the first wireless device may determine the group owner of the P2P group on the basis of the first connection capability and the second connection capability.

To solve the aforementioned technical problem, according to another embodiment of the present invention, a method for peer to peer (P2P) group formation in a first wireless device, which supports Wi-Fi Direct service comprises transmitting, via the first wireless device, a provision discovery request frame, which includes connection capabilities of the first wireless device, to a second wireless device; and receiving, via the first wireless device, a provision discovery response frame, which includes connection capabilities of the second wireless device, from the second wireless device. In this case, the connection capabilities may indicate at least one of New for initiating a new P2P group, Group Owner for becoming a group owner, Client for becoming a group client, and persistent group owner indicating reuse of an existing persistent group, and the first wireless device may determine the group owner of the P2P group on the basis of the first connection capability and the second connection capability.

To solve the aforementioned technical problem, according to still another embodiment of the present invention, a first wireless device for P2P group formation, which supports Wi-Fi Direct service, comprises a transceiver; and a processor, wherein the processor controls the transceiver to transmit a provision discovery request frame, which includes connection capabilities of the first wireless device, to a second wireless device and receive a provision discovery response frame, which includes connection capabilities of the second wireless device, from the second wireless device, and the first wireless device is set to determine a group owner and a group client in a P2P group on the basis of the first connection capability and the second connection capability. In this case, the connection capabilities may indicate at least one of New for initiating a new P2P group, Group Owner for becoming a group owner, and Client for becoming a group client.

To solve the aforementioned technical problem, according to further still another embodiment of the present invention, a first wireless device for P2P group formation, which supports Wi-Fi Direct service, comprises a transceiver; and a processor, wherein the processor controls the transceiver to transmit a provision discovery request frame, which includes connection capabilities of the first wireless device, to a second wireless device and receive a provision discovery response frame, which includes connection capabilities of the second wireless device, from the second wireless device, and the first wireless device is set to determine a group owner and a group client in a P2P group on the basis of the first connection capability and the second connection capability. In this case, the connection capabilities may indicate at least one of New for initiating a new P2P group, Group Owner for becoming a group owner, Client for becoming a group client, and persistent group owner indicating reuse of an existing persistent group.

The aforementioned embodiments and the following detailed description of the present invention are only exemplary, and are intended for additional description of the present invention cited in claims.

Advantageous Effects

According to the present invention, a method for peer to peer (P2P) group formation in a WFDS system and a device for the same may be provided. More specifically, according to the present invention, a method for controlling or managing ASP of a P2P device for P2P group formation may be provided.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 6 is a diagram illustrating a method for setup of a link for WFD communication;

FIG. 7 is a diagram illustrating a method for association with a communication group that performs WFD;

FIG. 8 is a diagram illustrating a method for setup of a link for WFD communication;

FIG. 9 is a diagram illustrating a method for setup of a link that is associated with a WFD communication group;

FIG. 18 is a diagram illustrating an operation performed when connection capability of a first P2P device indicates a group owner and connection capability of a second P2P device indicates a client; and FIG. 19 is a block diagram illustrating a wireless device according to one embodiment of the present invention.

BEST MODE FOR CARRYING OUT THE INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details.

Occasionally, to prevent the present invention from getting unclear, structures and/or devices known to the public are skipped or can be represented as block diagrams centering on the core functions of the structures and/or devices. Wherever possible, the same reference numbers will be used throughout the drawings to refer to the same or like parts.

Specific terminologies used for the following description may be provided to help the understanding of the present invention. And, the use of the specific terminology may be modified into other forms within the scope of the technical idea of the present invention.

Embodiments of the present invention may be supported by the disclosed standard documents of at least one of wireless access systems including IEEE 802 system, 3GPP system, 3GPP LTE system, LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) is an evolved version of 3GPP LTE.

For clarity, the following description mainly concerns IEEE 802.11 system, by which the technical features of the present invention may be non-limited.

Structure of WLAN System

Figure 1:
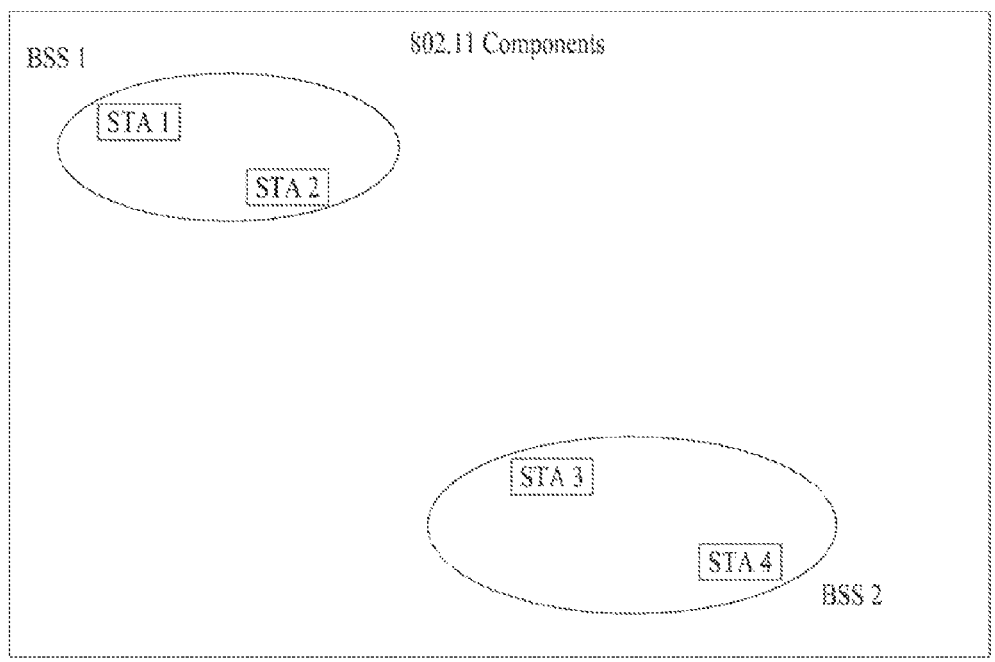
FIG. 1 is a diagram illustrating an exemplary structure of an IEEE 802.11 system to which the present invention may be applied.

FIG. 1 is a diagram for one example of a structure of IEEE 802.11 system to which the present invention is applicable.

IEEE 802.11 structure may include a plurality of components and WLAN supportive of transparent STA mobility for an upper layer can be provided by interactions of the components. A basic service set (BSS) may correspond to a basic configuration block in IEEE 802.11 LAN. FIG. 1 shows one example that two basic service sets BSS 1 and BSS 2 exist and that 2 STAs are included as members of each BSS. In particular, STA 1 and STA 2 are included in the BSS 1 and STA 3 and STA 4 are included in the BSS 2. In FIG. 1, an oval indicating the BSS can be understood as indicating a coverage area in which the STAs included in the corresponding BSS maintain communications. This area may be named a basic service area (BSA). Once the STA moves away from the BSA, it is unable to directly communicate with other STAs within the corresponding BSA.

A BSS of a most basic type in IEEE 802.11 LAN is an independent BSS (IBSS). For instance, IBSS can have a minimum configuration including 2 STAs only. Moreover, the BSS (e.g., BSS 1 or BSS 2) shown in FIG. 1, which has the simplest configuration and in which other components are omitted, may correspond to a representative example of the IBSS. Such a configuration is possible if STAs can directly communicate with each other. The above-configured LAN is not configured by being designed in advance but can be configured under the necessity of LAN. And, this may be called an ad-hoc network.

If an STA is turned on/off or enters/escapes from a BSS area, membership of the STA in a BSS can be dynamically changed. In order to obtain the membership in the BSS, The STA can join the BSS using a synchronization procedure. In order to access all services of the BSS based structure, the STA should be associated with the BSS. This association may be dynamically configured or may include a use of a DSS (distribution system service).

Layer Structure

The operation of the STA which is operated in the wireless LAN system may be described in view of layer structure. In aspect of device configuration, layer structure may be implemented by a processor. The STA may have a structure of a plurality of layers. For example, a layer structure handled by the 802.11 standard document mainly includes a MAC sublayer and a physical (PHY) layer on a data link layer (DLL). The PHY layer may include a physical layer convergence procedure (PLCP) entity, a physical medium dependent (PMD) entity, etc. The MAC sublayer and the PHY layer conceptionally include management entities called MAC sublayer management entity (MLME) and physical layer management entity (PLME), respectively. These entities provide a layer management service interface that operates a layer management function.

In order to provide exact MAC operation, an SME (Station Management Entity) is present within each STA. The SME is a layer independent entity that may be viewed as residing in a separate management plane or as residing "off to the side." The exact functions of the SME are not specified in this document, but in general this entity may be viewed as being responsible for such functions as the gathering of layer-dependent status from the various layer management entities (LMEs), and similarly setting the value of layer-specific parameters. The SME may perform such functions on behalf of general system management entities and may implement standard management protocols.

The aforementioned entities interact in various ways. For example, the entities may interact by exchanging GET/SET primitives. The primitive means a set of elements or parameters related to a specific object. XX-GET.request primitive is used for requesting the value of the given MIB attribute (management information base attribute). XX-GET.confirm primitive is used for returning the appropriate MIB attribute value if status is "success," otherwise returning an error indication in the Status field. XX-SET.request primitive is used for requesting that the indicated MIB attribute be set to the given value. If this MIB attribute implies a specific action, this requests that the action be performed. And, XX-SET.confirm primitive is used such that, if status is "success," this confirms that the indicated MIB attribute has been set to the requested value, otherwise it returns an error condition in the status field. If this MIB attribute implies a specific action, this confirms that the action has been performed.

Also, the MLME and the SME may exchange various MLME_GET/SET primitives through MLME_SAP (Service Access Point). Also, various PLME_GET/SET primitives may be exchanged between PLME and SME through PLME_SAP, and may be exchanged between the MLME and PLME through MLME-PLME_SAP.

Evolution of Wireless LAN

Standards for Wireless Local Area Network (WLAN) technology have been developed by Institute of Electrical and Electronics Engineers (IEEE) 802.11 group. IEEE 802.11a and 802.11b use an unlicensed band at 2.4 GHz or 5 GHz. IEEE 802.11b provides a transmission rate of 11 Mbps and IEEE 802.11a provides a transmission rate of 54 Mbps. IEEE 802.11g applies Orthogonal Frequency-Division Multiplexing (OFDM) at 2.4 GHz to provide a transmission rate of 54 Mbps. IEEE 802.11n may use Multiple Input Multiple Output (MIMO)-OFDM, and provide a transmission rate of 300 Mbps. IEEE 802.11n may support a channel bandwidth up to 40 MHz to provide a transmission rate of 600 Mbps.

A direct link setup (DLS) related protocol under the environment according to IEEE 802.11e is based on QBSS (Quality BSS (basic service set)) that BSS supports QoS (Quality of Service). In QBSS, AP as well as non-AP STA is a QAP (Quality AP) that supports QoS. However, under the WLAN environment (for example, WLAN environment according to IEEE 802.11a/b/g) which is currently commercialized, although the non-AP STA is a QSTA (Quality STA) that supports QoS, the AP is likely to be a legacy AP that fails to support QoS. As a result, there is a limitation that DLS service cannot be used even in case of the QSTA under the WLAN environment which is currently commercialized.

Tunneled direct link setup (TDLS) is a wireless communication protocol which is newly suggested to solve such a limitation. TDLS, although not supporting QoS, enables QSTAs to set a direct link even under the WLAN environment such as IEEE 802.11a/b/g which is currently commercialized and set a direct link even in case of a power save mode (PSM). Accordingly, TDLS prescribes all the procedures for enabling QSTAs to set a direct link even at BSS managed by the legacy AP. Hereinafter, a wireless network that supports TDLS will be referred to as a TDLS wireless network.

Wi-Fi Direct Network

The WLAN according to the related art has mainly handled the operation of an infrastructure BSS that a radio access point (AP) functions as a hub. The AP performs a physical layer support function for wireless/wire connection, a routing function for devices on the network, and service provision for adding/removing a device to/from the network.

In this case, devices within the network are not directly connected with each other but connected with each other through the AP.

As technology for supporting direct connection between devices, enactment of Wi-Fi Direct standard has been discussed.

Figure 2:
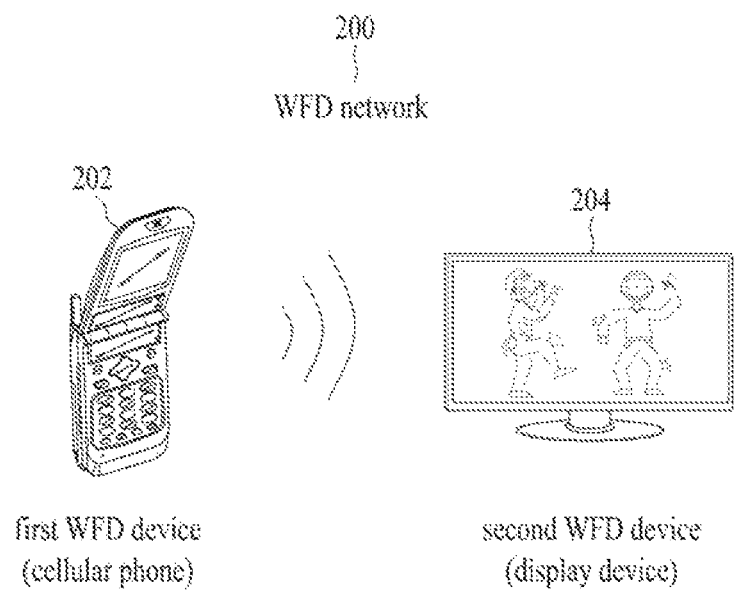
FIG. 2 is a diagram illustrating a WFD (Wi-Fi Direct) network.

FIG. 2 is a diagram illustrating a WFD (Wi-Fi Direct) network. The WFD network is a network that enables Wi-Fi devices to perform device-to-device (D2D) (or peer-to-peer (P2P)) communication even without association with a home network, office network and hot spot network, and has been suggested by Wi-Fi Alliance. Hereinafter, WFD based communication will be referred to as WFD D2D communication (simply D2D communication) or WFD P2P communication (simply, P2P communication). Also, a device that performs WFD P2P will be referred to as WFD P2P device, simply referred to as P2P device or Peer device.

Referring to FIG. 2, the WFD network 200 may include at least one Wi-Fi device that includes a first P2P device 202 and a second P2P device 204. The P2P device may include Wi-Fi supporting devices, for example, a display device, a printer, a digital camera, a projector, a smart phone, etc. In addition, the P2P device may include a non-AP STA and an AP STA. In this example, the first P2P device 202 is a smart phone, and the second P2P device 204 is a display device. The P2P devices of the WFD network may directly be interconnected. In more detail, P2P communication may mean that a signal transmission path between two P2P devices is directly configured in the corresponding P2P devices without passing through a third device (e.g., AP) or a legacy network (e.g., a network accessed to WLAN through an AP). In this case, a signal transmission path directly configured between two P2P devices may be limited to a data transmission path. For example, P2P communication may mean that a plurality of non-STAs transmit data (e.g., voice, image, text information, etc.) without passing through the AP. A signal transmission path for control information (e.g., resource allocation information for P2P configuration, wireless device identification information, etc.) may directly be configured between P2P devices (e.g., non-AP STA to non-AP STA, non-AP STA to AP), may be configured between two P2P devices (e.g., non-AP to non-AP STA) through the AP, or may be configured between the AP and the corresponding P2P device (e.g., AP to non-AP STA #1, AP to non-AP STA #2).

Figure 3:
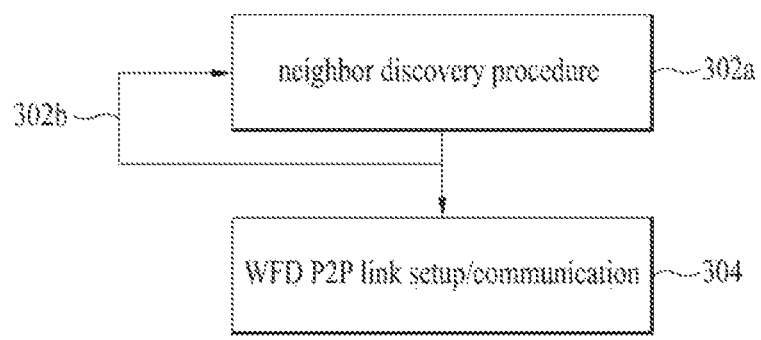
FIG. 3 is a diagram illustrating a procedure of configuring a WFD network.

FIG. 3 is a diagram illustrating a method for configuring a WFD network.

Referring to FIG. 3, the WFD network setup procedure may be largely classified into two procedures. The first procedure is a neighbor discovery (ND) procedure (S302a), and the second procedure is a P2P link configuration and communication procedure (S304). Through the neighbor discovery procedure, the P2P device (e.g., 202 of FIG. 2) searches for another neighbor P2P device (e.g., 204 of FIG. 2) within (its own radio) coverage, and may obtain information required for association (e.g., pre-association) with the corresponding P2P device. In this case, the pre-association may mean a second layer pre-association in a radio protocol. For example, information required for the pre-association may include identification information of the neighbor P2P device. The neighbor discovery procedure may be carried out per available radio channel (S302b). Afterwards, the P2P device 202 may perform WFD P2P link configuration/communication with another P2P device 204. For example, after the P2P device 202 is associated with a peripheral P2P device 204, the P2P device 202 may determine whether the corresponding P2P device 204 is a P2P device incapable of satisfying service requirements of a user. To this end, after the P2P device 202 is second layer pre-associated with the peripheral P2P device 204, the P2P device 202 may search for the corresponding P2P device 204. If the corresponding P2P device 204 does not satisfy service requirements of the user, the P2P device 202 may sever the second layer association configured for the corresponding P2P device 204, and may configure the second layer association with another P2P device. By contrast, if the corresponding P2P device 204 satisfies the service requirements of the user, the two P2P devices 202 and 204 may transmit and receive signals through a P2P link.

Figure 4:
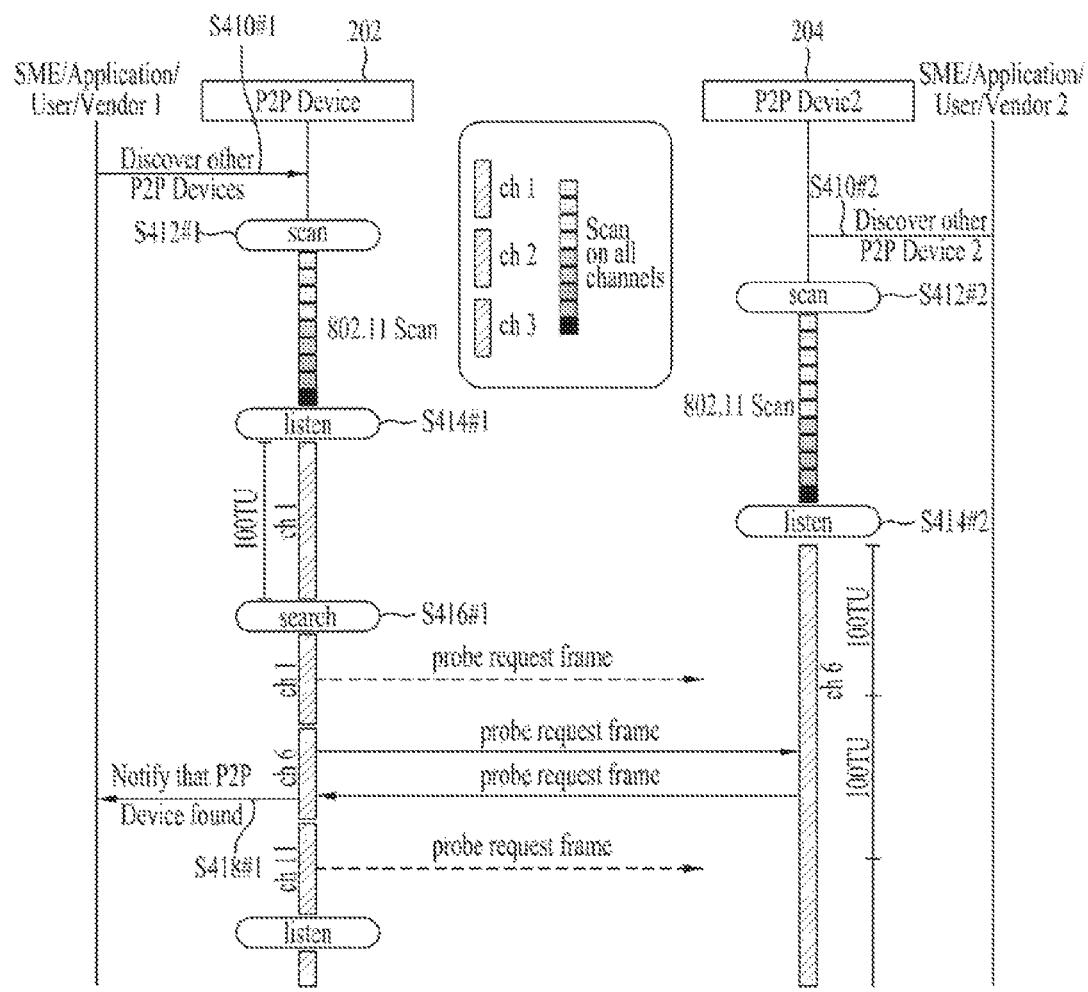
FIG. 4 is a diagram illustrating a neighboring discovery procedure.

FIG. 4 is a diagram illustrating a neighboring discovery procedure. The example of FIG. 4 may be understood as an operation between the P2P device 202 and the P2P device 204 shown in FIG. 3.

Referring to FIG. 4, the neighbor discovery procedure of FIG. 3 may be initiated by indication of station management entity (SME)/application/user/vendor (S410), and may be classified into a scanning step S412 and finding steps S414 to S416. The scanning step S412 may include the operation for scanning all available RF channels according to 802.11 schemes. Through the above-mentioned operation, the P2P device may confirm the best operation channel. The finding steps S414 to S416 may include a listening mode S414 and a search mode S416. The P2P device may alternately repeat the listening mode S414 and the search mode S416. The P2P devices 202 and 204 may perform active search by using a probe request frame in the search mode S416. For rapid search, the search range may be limited to social channels denoted by Channels #1, #6, #11 (2412, 2437, 2462 MHz). In addition, the P2P devices 202 and 204 may select only one channel from three social channels in the listening mode S414, and maintain a reception status. In this case, if the other P2P device (e.g., 202) receives the probe request frame transmitted in the search mode, the P2P device (e.g., 204) generates a probe response frame in response to the received probe request frame. A time of the listening mode S414 may be given at random (e.g., 100, 200, 300 time unit (TU)). The P2P devices continuously repeat the search mode and the reception mode so that they may reach a common channel. After the P2P device discovers another P2P device, the P2P device may discover/exchange a device type, a manufacturer, or a familiar device name by using the probe request frame and the probe response frame such that the P2P device may selectively be coupled to the corresponding P2P device. If the P2P device discovers the peripheral P2P device and obtains necessary information through the neighbor discovery procedure, the P2P device (e.g., 202) may notify SME/application/user/vendor of the P2P device discovery (S418).

Presently, P2P may be mainly used for semi-static communication such as remote printing, photo sharing, etc. However, due to generalization of Wi-Fi devices and location based services, P2P availability is gradually increased. For example, it is expected that the P2P device will actively be used for social chatting (for example, wireless devices subscribed to Social Network Service (SNS) recognize radio devices located in a neighboring region on the basis of the location based service and transmit and receive information), location-based advertisement provision, location-based news broadcasting, and game interaction between wireless devices. For convenience of description, such P2P application will hereinafter be referred to as new P2P application.

Figure 5:
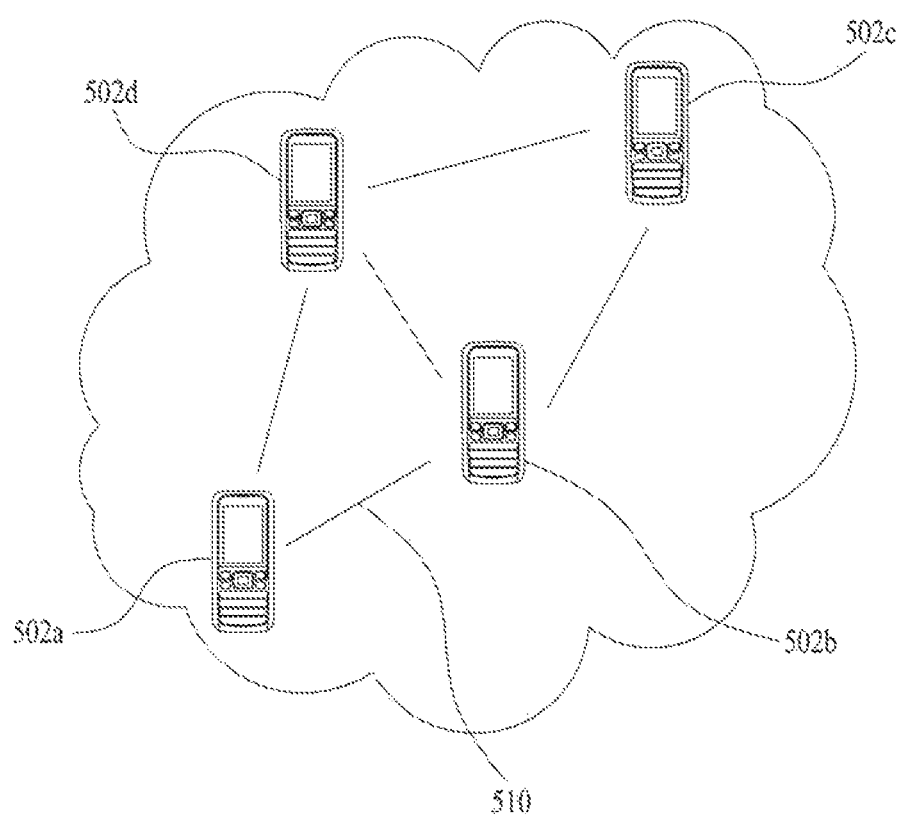
FIG. 5 is a diagram illustrating new aspect of a WFD network.

FIG. 5 is a diagram illustrating new aspect of a WFD network.

The example of FIG. 5 may be understood as WFD network aspect for use in the case in which new P2P application (e.g., social chatting, location-based service provision, game interaction, etc.) is applied.

Referring to FIG. 5, a plurality of P2P devices 502a to 502d performs P2P communication 510 in the WFD network, P2P device(s) constituting the WFD network may be changed at any time due to movement of the P2P device(s), and a new WFD network may be dynamically generated or deleted within a short time. As described above, characteristics of the new P2P application indicate that P2P communication may dynamically be performed and terminated within a short time among a plurality of P2P devices in the dense network environment.

FIG. 6 is a diagram illustrating a method for setup of a link for WFD communication.

As shown in FIG. 6a, a first STA 610 (hereinafter, referred to as "A") is being operated as a group owner during conventional WFD communication. If the A 610 discovers a second STA 620 (hereinafter, referred to as "B"), which is a new WFD communication target and does not perform WFD communication, during communication with a group client 630 of conventional WFD communication, the A 610 tries link setup with the B 620. In this case, new WFD communication is WFD communication between the A 610 and the B 620, and since the A is a group owner, the A may perform communication setup separately from communication of the conventional group client 630. Since one WFD group may include one group owner and one or more group clients, as shown in FIG. 6b, a WFD link may be set as the A 610 which is one group owner is satisfied. In this case, the A 610 invites the B 620 to the conventional WFD communication group, and in view of WFD communication characteristic, WFD communication between the A 610 and the B 620 and between the A 610 and the conventional group client 630 may be performed but WFD communication between the B 620 and the conventional group client 630 is not supported. This is because that both the B 620 and the group client 630 are the group clients.

FIG. 7 is a diagram illustrating a method for association with a communication group that performs WFD.

As shown in FIG. 7a, a first STA 710 (hereinafter, referred to as "A") is performing communication as a group owner for a group client 730, and a second STA 720 (hereinafter, referred to as "B") is performing communication as a group owner for a group client 740. As shown in FIG. 7b, the A 710 may terminate conventional WFD communication and may perform association with a WFD communication group to which the B 720 belongs. Since the A 710 is a group owner, the A 710 becomes a group client. Preferably, the A 710 terminates the conventional WFD communication before requesting association with the B 720.

FIG. 8 is a diagram illustrating a method for configuring a link for WFD communication.

As shown in FIG. 8a, a second STA 820 (hereinafter, referred to as "B") is being operated as a group owner during conventional WFD communication. If the B 820 is performing conventional WFD communication with a group client 830, a first STA 810 (hereinafter, referred to as "A"), which does not perform the WFD communication, discovers the B 820 and tries link setup for new WFD communication with the B 820. In this case, if the B 820 accepts link setup, a new WFD communication link between the A 810 and the B 820 is set, and the A 810 is operated as a client of conventional WFD group of the B 820. This case corresponds to the case where the A 810 performs association with the WFD communication group of the B 820. The A 810 may only perform WFD communication with the B 820 which is a group owner, and WFD communication between the A 810 and the client 830 of the conventional WFD communication is not supported. This is because that both the A 810 and the client 830 are the group clients.

FIG. 9 is a diagram illustrating a method for configuring a link that is associated with a WFD communication group.

As shown in FIG. 9a, a first STA 910 (hereinafter, referred to as "A") is performing WFD communication as a group client for a group owner 930. At this time, the A 910 discovers a second STA 920 (hereinafter, referred to as "B"), which is performing communication as a group owner for a group client 940 of another WFD communication, and terminates a link with the group owner 930. And, the A 910 may perform association with Wi-Fi Direct of the B 920.

Wi-Fi Direct Service (WFDS)

Wi-Fi Direct is the network connection standard technology defined to include an operation of a link layer. Since the standard of an application operated in an upper layer of a link configured by Wi-Fi Direct is not defined, it is difficult to support compatibility in the case that the application is driven after devices which support Wi-Fi Direct are interconnected. To solve this problem, standardization of the operation of the upper layer application called Wi-Fi Direct Service (WFDS) has been discussed by the Wi-Fi Alliance (WFA).

Figure 10:
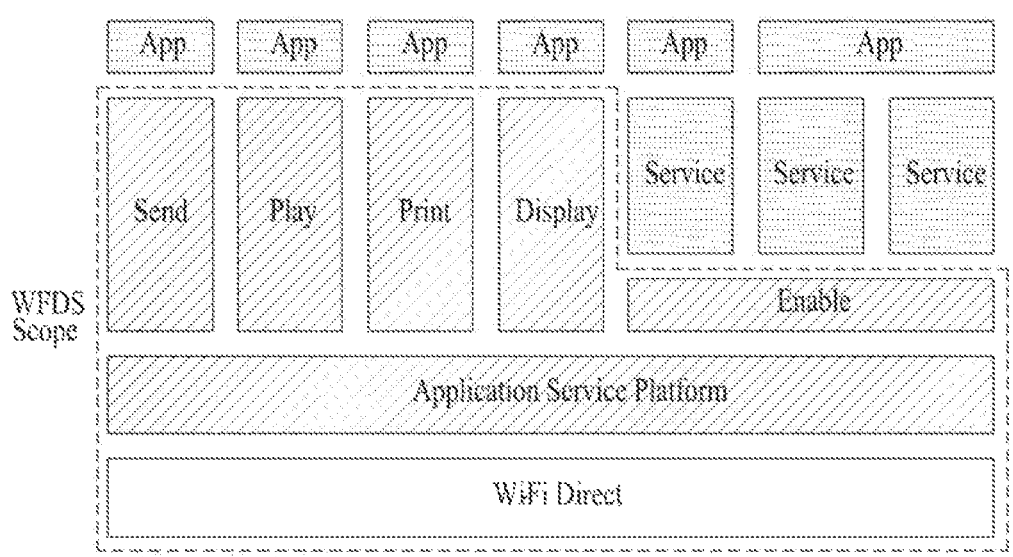
FIG. 10 is a diagram illustrating WFDS framework components.

FIG. 10 is a diagram illustrating WFDS framework components.

A Wi-Fi Direct layer of FIG. 10 means a MAC layer defined by the Wi-Fi Direct standard. The Wi-Fi Direct layer may include software compatible with the Wi-Fi Direct standard. Wireless connection may be configured below the Wi-Fi Direct layer by a physical layer (not shown) compatible with WiFi PHY layer. A platform called an ASP (Application Service Platform) is defined above the Wi-Fi Direct layer.

The ASP is a logical entity that implements functions required for services. The ASP is a common shared platform, and may process tasks such as device discovery, service discovery, ASP session management, connection topology management and security between an application layer above the ASP and the Wi-Fi Direct layer below the ASP.

A service layer is defined above the ASP. The service layer includes use case specific services. The WFA defines four basis services, Send, Play, Display and Print services. The four basic services defined in the WFA will be described briefly. First of all, Send means service and application that may perform file transfer between two WFDS devices. The Send service may be referred to as a file transfer service (FTS) in that it is intended for file transfer between peer devices. Play means a service and application that shares or streams audio/video (A/V), photo, music, etc. based on DLNA (Digital Living Network Alliance) between two WFDS devices. Print means a service and application that enables documents and photos to be output between a device having contents such as documents, photos, etc. and a printer. Display means a service and application that enables screen sharing between a Miracast source and a sink of WFA.

An enable API (Application Program Interface) shown in FIG. 10 is defined to use an ASP common platform in the case that a third party application in addition to basic service defined by the WFA is supported. The service defined for the third party application may be used by one application only, or may be used generally (or commonly) by various applications.

Hereinafter, for convenience of description, the service defined by the WFA will be referred to as a WFA service, and the service newly defined by the third party not the WFA will be referred to as an enable service.

The application layer may provide a user interface (UI), and serves to express information to be recognized by the user and transfer an input of the user to a lower layer.

Figure 11:
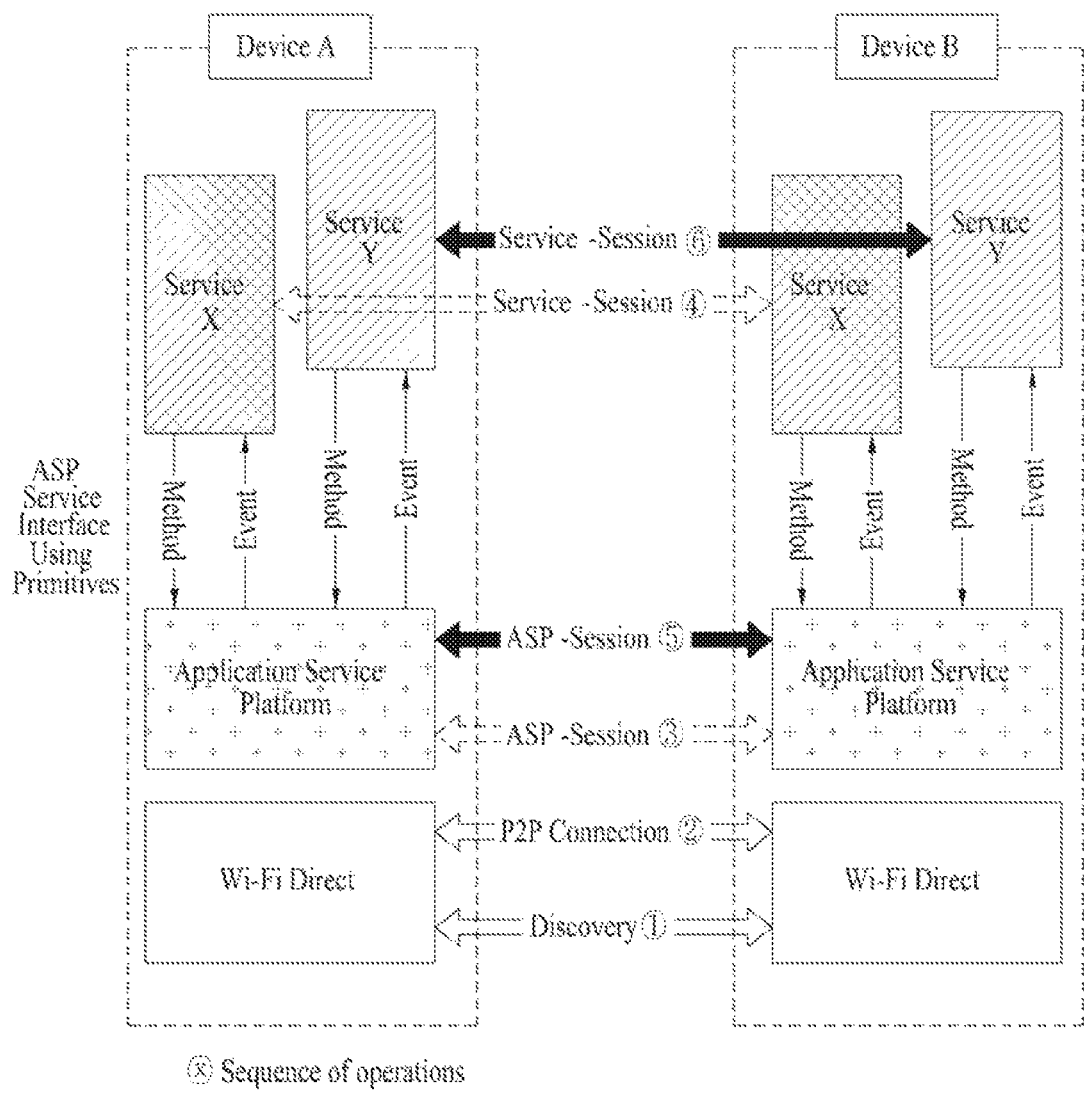
FIG. 11 is a diagram illustrating WFDS operation.

FIG. 11 is a diagram illustrating WFDS operation.

In FIG. 11, it is assumed that two peer devices A and B exist.

The ASP is a logical entity that implements common functions required by the services. These functions may include device discovery, service discovery, ASP-session management, connection topology management, security, etc.

The ASP-session is a logical link between the ASP of the device A and the ASP of the device B. Peer-to-peer (P2P) connection between peer devices is required to start the ASP-session. The ASP may setup a plurality of ASP-sessions between the two devices. Each of the ASP-sessions may be identified by a session identifier allocated by the ASP that requires the ASP-session.

The service is a logical entity that provides other services or application with use case specific functions by using the ASP. The service of one device may perform communication with the corresponding service of one or more other devices by using a service-specific protocol (that may be defined by the service standard and ASP protocol).

The interface between the ASP and the service is defined by Method and Event. The Method indicates the operation initiated by the service, and information on an operation which will be performed may be included in a parameter (or field) of the Method. The Event provides information from the ASP to the service.

Figure 12:
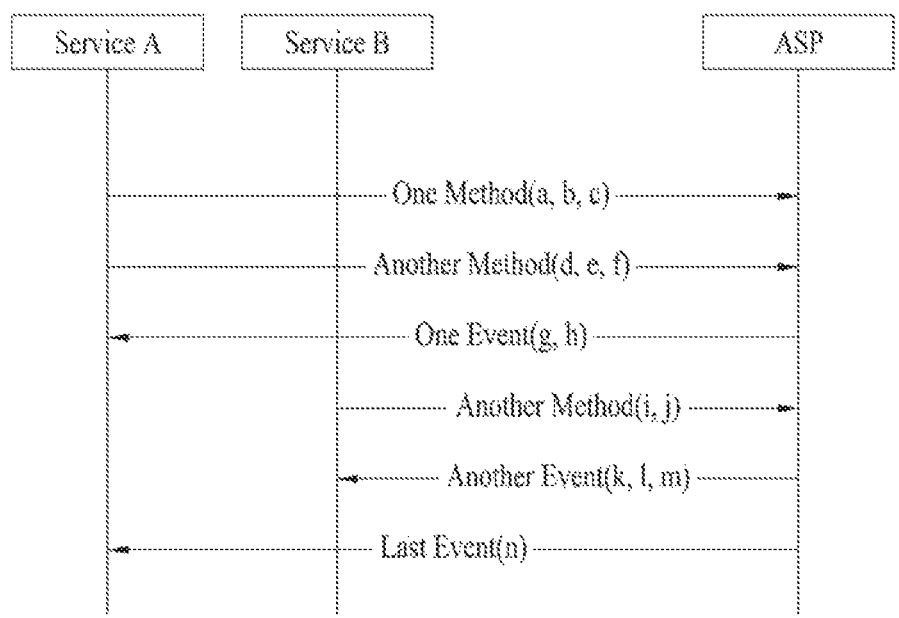
FIG. 12 is a diagram illustrating an example of transmitting Event and Method between an ASP and a service.

For example, FIG. 12 is a diagram illustrating an example of transmitting Event and Method between an ASP and a service.

If the service performs Method call, information limited to a method call returning value returns to the service. Every Method call basically returns immediately. Accordingly, the value returning to the service should not depend on either information acquired through the network, which causes delay of method call return, or information acquired from the user.

The ASP provides information to the service through the Event. In the same manner as the Method, the Event transmits data to the parameters. Since the Event is transmitted in one direction, if the service takes action on the basis of content of the Event, Method call should be accompanied.

A plurality of services that perform communication with the ASP may use the Method and the Event. The Method may be propagated from the service to the ASP, and the Event may be propagated from the ASP to a specific service. The Event does not need to immediately respond to Method call.

Referring to FIG. 11 again, if the user desires to use service X between the device A and the device B, the ASPs on the respective devices generate ASP-session dedicated for the service X between the devices. Afterwards, if the user desires to use service Y, new ASP-session for the corresponding service is established. If a plurality of ASP sessions are established between the peer devices, each of the plurality of ASP sessions may be identified by a session identifier allocated by the peer device (specifically, ASP of the peer device that has requested establishment of the ASP session) that has requested establishment of the ASP session.

In defining the operation between the two peer devices in the WFDS, one of the two peer devices may serve as a service advertiser and the other one may serve as a service seeker. If the service seeker searches for a desired service by discovering service advertiser(s), the service seeker may request connection with the service advertiser.

The peer device set by the service seeker searches for the peer device set by the service advertiser, and if the peer device set by the service seeker discovers a desired service from the peer device set by the service advertiser, the corresponding peer device may request the peer device set by the service advertiser of connection. In more detail, if the service seeker requests the service advertiser of ASP service session establishment, the service advertiser may respond to the ASP session establishment request of the service seeker.

The relation between the service advertiser and the service seeker is not fixed. For example, the role as the service advertiser and the service seeker may be varied depending on any one ASP session and next ASP session. Whether the peer device acts as the service advertiser or the service seeker may be determined based on which peer device has started to search for the service. In other words, the peer device that requests search of the service may act as the service seeker.

Also, any one of the peer devices may be set to both the service advertiser and the service seeker for the same service, and may have a plurality of service advertisers or a plurality of service seekers. For example, any one of the peer devices may be set to the service advertiser for the first Wi-Fi Direct service and the second Wi-Fi Direct service, and at the same time may be set to the service seeker for the third Wi-Fi Direct service and the fourth Wi-Fi Direct service.

Hereinafter, the service advertiser and the service seeker will be described in more detail.

Service Advertiser and Service Seeker

The peer device set to the service advertiser may advertise service(s), and the service seeker may discover the advertised service(s). The peer device set to the service advertiser may advertise service(s) until a call of cancel service advertisement method CancelAdvertiseService Method is performed or an advertisement status is set to 'Cancel' (for example, status value of AdvertiseStatus parameter indicates NotAdvertised). At least one of post association and pre-association may be used to allow the service advertiser to advertise the service(s).

The service(s) advertised by the service advertiser may be identified by service name. In more detail, the peer devices may control the services such that each service may include UTF-8 service name text strings for the service search. In this case, the service name encoded as UTF-8 may have a length 255 bytes or less. The length of the service name may be determined by a space that may be used by a service search request frame and a service search response frame.

The text string "org.wi-fi" may be reserved to identify the WFA service. In more detail, the WFA service names are as follows.

org.wi-fi.wfds.send.tx
org.wi-fi.wfds.send.rx
org.wi-fi.wfds.play.tx
org.wi-fi.wfds.play.rx
org.wi-fi.wfds.display.tx
org.wi-fi.wfds.display.rx
org.wi-fi.wfds.print.tx
org.wi-fi.wfds.print.rx If the enable service attempts advertisement or search by using the service name starting from org.wi-fi, the ASP may reject attempt of the enable service for advertisement or search. For the enable service, reverse domain name notation may be used. According to the reverse domain name notation, reverse arrangement (for example, com.example) of respective components (for example, example and com) at DNS name (for example, example.com) owned by an application author may be used as a prefix of service name of the enable service.

Accordingly, the name of the enable service may be defined as follows.

com.example.serviceX
com.example.productY
com.example.04cf75db-19d1-4d84-bef3-b13b33fcfa5a The enable service may be defined for one application, and may be defined to be generally implemented in various applications.

The service is identified by service name and at the same time defined as service information. Accordingly, even in case of services of the same service name, if the services have different kinds of service information, the services may be handled as those different from each other.

In advertising the services, the service advertiser may allocate advertisement ID to each service which is advertised. The service advertiser may control the services such that separate advertisement ID may be allocated to each service.

The service advertisement may be used even in case of post association. To this end, the peer devices may establishment of additional ASP session after P2P group is formed.

The service search procedure is not required necessarily in the case that the service seeker starts ASP session. The service seeker may allow an out of band mechanism to perform the service search procedure. Also, the service seeker may cache the service of the peer device, wherein the service is already discovered.

The service search procedure may support wild card search (or name search). Wild card search may mean that prefix search is supported. Prefix search may mean that search of all the services including prefix may be performed. For example, in order to search for all the WFA services (that is, Send, Play, Display, Print), wild card search including search keyword 'org.wi-fi.wfds.*' (or 'org.wi-fi.wfds*') may be allowed. In this case, as a result of wild card search, a list of all the services including 'org.wi-fi.wfds' may be returned.

In order to search for a specific WFA service, wild card search including a search keyword 'org.wi-fi.wfds.servicename.*' (or 'org.wi-fi.wfds.servicename*') (in this case, servicename may be any one of Send, Play, Display, and Print) may be allowed. In this case, as a result of wild card search, a list of all the services including prefix 'org.wi-fi.wfds.servicename' may be returned. Of course, wild card may be allowed even in case of the enable service.

Wild card search may be allowed for words separated from each other by dot ('.'). For example, if the name of the enable service is "com.example.serviceX", wild card search may be allowed for 'com.*'(or 'com*'), 'com.example.*'(or 'com.example*').

Hereinafter, Method and Event, which are handled by the service advertiser and the service seeker, will be described in more detail.

Method of Service Advertiser

The service advertiser may call Advertise Service Method to advertise services. In this case, the service seeker may start search, discovery and ASP session of the service which is advertised. Advertise Service Method may include at least one of service name parameter (or list parameter of service name), port parameter, protocol parameter, sharing parameter, automatic acceptance parameter, and service information parameter. Each parameter will be described as follows.

i) Service Name (or List of Service Names)

The service name identifies features of a service that may be searched by the service seeker that requests service search (for example, performs SeekService Method call). Service name matching may be performed through comparison between the service name and text string included in a query from the service seeker.

If a plurality of services are used for matching, Advertise Service Method may include a list of service names including a plurality of service names. For example, if the service supports transmission and reception through the same port, service name (for example, service.tx) for transmission and service name (service.rx) for reception may be included in the list of service names. For example, if the service name requesting search is org.wi-fi.wfds.send, and the service supports both org.wi-fi.wfds.send.rx and org.wi-fi.wfds.send.tx, the list of service names may include "org.wi-fi.wfds.send", "org.wi-fi.wfds.send.rx" and "org.wi-fi.wfds.send.tx".

If the service supports all the WFA services through the same port number, the list of service names may include names of all the WFA services and service name for transmission from all the WFA services. For example, if the service supports all WFA services, the list of service names may include "org.wi-fi.wfds.send.tx, org.wi-fi.wfds.send.rx, org.wi-fi.wfds.send, org.wi-fi.wfds.play.tx, org.wi-fi.wfds.play.rx, org.wi-fi.wfds.play, org.wi-fi.wfds.display.tx, org.wi-fi.wfds. display.rx, org.wi-fi.wfds. display, org.wi-fi.wfds.print.tx, org.wi-fi.wfds.print.rx, and org.wi-fi.wfds.print".

ii) Service Port

The service port is an IP port that listens to a registered service and is also an IP port for connection, which is received from the service seeker. The service advertiser may notify the service seeker of the service port as a result parameter of service name search. However, the service port may not be searched by the service seeker unlike the service name. Since the service port is reserved, the same service port cannot be used by different services or different active ASP sessions as far as the service port is not set to be shared by them (for example, as far as sharing parameter is not set to "true").

When Advertise Service method requesting service advertisement is called, if the service port cannot be used, Event (for example, Advertise Failed Event) indicating that service advertisement has been failed may be transmitted from the ASP to the service.

When the ASP session for the service is generated, and the network interface is known, the service port may be bound by the application.

iii) Protocol

The protocol may be defined as an integer defined in the IANA (Internet Assigned Number Authority). For example, TCP may be defined as number 6, and UDP may be defined as number 17.

iv) Sharing

The sharing parameter indicates whether another service and service port will be allowed. For example, if the sharing parameter has a value of "True", the service port may be reused by another advertisement and ASP session. The ASP session that shares the service port should not control the service port exclusively. Unlike this, if the sharing parameter has a value of "Service", the service port may be reused by advertisement of other services having the same service name. If the sharing parameter has a value of "False", one service may control the service port exclusively.

If the service requests exclusive use of the service port used by the service which is being currently advertised, the ASP may transmit Advertise Failed Event indicating that advertisement has been failed, to the service. The ASP may transmit Event indicating that advertisement has been failed, to the service, even in the case that the service requests sharing of the service port of which exclusive use is reserved. The ASP may transmit Event indicating that advertisement has been failed, to the service, even in case that the service requests that the service port already shared with another Advertise Service Method should be set to a non-sharing service port.

v) Automatic Acceptance

The ASP of the service advertiser may transmit session request event Session Request Event to a service layer to set up the ASP session. At this time, if the automatic acceptance parameter has a value of "True", the service advertiser may accept every ASP-session request from the service seeker even though the service layer does not call session confirmation method Confirm Session Method in response to the session request event.

However, if a parameter, get network config PIN is set to True in the session request event SessionRequest Event, the event may be required to be transmitted from the service layer to the ASP layer as service confirmation method (or session confirmation method).

If the automatic acceptance parameter has a value of "False", the ASP of the service advertiser may determine whether to accept the ASP session request by waiting for reception of the session confirmation method from the service. The session request event for ASP session setup may be transmitted from the ASP to the service regardless of the value of the automatic acceptance parameter.

vi) Service Information

The service information means detailed information on the service used during the service search procedure. A content of the service information is a free-form selective parameter. If the service information exists, the service information may be transferred to the service seeker as one response within the service search response frame.

The service seeker may perform search on the basis of the content of the service information by embodying service information request within service seek method SeekService Method.

vii) Service Status

The service status indicates a status of the service at the time when Advertise Service Method is called. For example, if the service status parameter has a value of '1', it may indicate that the service is available, and if the service status parameter has a value of '0', it may indicate that the service is unavailable. However, even though the service is unavailable, the service advertiser may indicate that the device supports the corresponding service in response to the probe request frame or the service search request frame.

If the service status parameter has a value of '0' (that is, if the service is unavailable), the ASP may reject a request for ASP session setup.

viii) Network Role

The network role indicates whether the service advertiser should be set to a group owner (GO) in the P2P group. For example, if the network role parameter has a value of '1', it may indicate that the service advertiser should be set to GO within the P2P group, and if the network role parameter has a value of '0', it may mean that the status of the service advertiser is disregarded.

ix) Network Setup

The network setup parameter indicates desired WSC configuration method (WSC Config.Method) for connection. For example, if the network setup parameter has a value of '1', it may indicate WFDS default setup method or WSC PIN method, and if the network setup parameter has a value of '2', it may indicate WSC PIN method only.

x) Delay Session Response

A value of the delay session response parameter may be null basically as far as an explicit specific service is not provided. Also, the delay session response parameter may exist only if the value of the automatic acceptance parameter is "False".

If the value of the delay session parameter exists, the delay session parameter may be regarded as a message frame transmitted from the service advertiser to the service seeker when the value of the automatic acceptance parameter of the service advertiser is set to False and the service seeker desires to generate ASP session.

For example, if the service seeker transmits a provision discovery request frame to generate ASP session, the delay session parameter may be included in a provision discovery response frame transmitted from the service advertiser as a session information field.

For another example, if the service seeker transmits a session request message Request_Session message to generate ASP session, the delay session response parameter may be included in a deferred session ASP coordination protocol message as a delay session response field.

The ASP may return advertisement ID for Advertise Service Method. The advertisement ID is allocated by the ASP, and identifies advertisement uniquely on the device manipulated by the service of which advertisement is requested. And, the advertisement ID may be transmitted to the service seeker to establish ASP session of the advertised service.

The service advertiser may call Service Status Change Method (ServiceStatusChange Method) indicating service status change if the status of the existing advertisement is changed. The service status change method may include the advertisement ID and the service status parameter. Each parameter will be described as follows.

i) Advertisement ID

The advertisement ID may include originally advertisement ID returned by the Advertise Service Method.

ii) Service status

If the service is in the available status, the value of the service status parameter may be set to "Available". If the service supported by the service advertiser is in the unavailable status at the time when the service is supported by the service advertiser, the value of the service status parameter may be set to "Unavailable". The value of the service status parameter may be included in the probe response frame or the service search response frame.

The service advertiser may call cancel service advertisement method CancelAdvertiseService Method to cancel the existing advertisement. If the service advertiser calls the cancel service advertisement method CancelAdvertiseService method, service name and associated information are not advertised any more, and reservation of the service port is released.

If the service receives the session request event from the ASP, the service advertiser may call the session confirmation method SessionConfirm Method to determine whether to accept ASP session setup. The session confirmation method may be referred to as service confirmation method Confrm Service Method in that it indicates whether to accept session setup of the specific service. However, if advertisement starts automatically (for example, if the value of the automatic acceptance parameter of the Advertise Service Method is "True"), since ASP session setup is accepted automatically, the session confirmation method may not be called.

The session confirmation method may include at least one of session MAC parameter, session ID parameter, and confirmed parameter. Each parameter will be described in more detail as follows.

i) Session MAC

The session MAC indicates MAC address of the device to which session ID is allocated.

ii) Session ID

The session ID indicates an identifier of ASP session.

iii) Confirmed

If the confirmed parameter has a value of True, ASP session setup may be performed. Also, if the existing P2P group does not exist, group may be formed. Unlike this, if the confirmed parameter has a value of False, the requested ASP session may be closed.

Method of Service Seeker

The service seeker may call service seek method SeekService Method that requests service search for searching for services of the peer device serving as the service advertiser. The search range may be limited selectively by MAC address. The service seek method may include at least one of service name, exact search, MAC address, and service information request parameter. Each parameter will be described in more detail as follows.

i) Service Name

The service name parameter indicates name of a service which should be searched. Text string included in the service name parameter may be exact name of the service which should be searched, and may be prefix of service name which should be searched.

An example of prefix search may include name only of specific service without including names of both reception service and transmission service, to search for the reception service and the transmission service for the specific service. For example, in order that the service searches for org.wi-fi.wfds.send.rx and org.wi-fi.wfds.send.tx for Send service, org.wi-fi.wfds.send commonly included in both org.wi-fi.wfds.send.rx and org.wi-fi.wfds.send.tx may be inserted to the service name parameter.

In order to search for all WFA services, text string "org.wi-fi.wfds" which is commonly included in all WFA service names may be included in the service name parameter.

ii) Exact Search

If the value of the exact search parameter is "True", exact search is performed. In more detail, the service exactly matched with the text string included in the service name parameter may be searched through exchange of probe request and response frames.

If the value of the exact search parameter is "False", prefix search is performed. In more detail, for prefix search, in addition to exchange of probe request and response frames, exchange of service search request and response frames may be performed. All the services that include the text string included in the service name parameter as prefix may be searched through exchange of the service search request and response frames.

Since only the device exactly matched with the text string included in the service name parameter responds to the probe request during device search, exact search is faster than prefix.

iii) MAC Address

Since the MAC address is intended to search for services of all of peer Wi-Fi Direct devices, MAC address parameter may generally be set to NULL. However, if MAC address value of a specific peer device is included in the MAC address parameter, service search may be performed restrictively for specified MAC address. MAC address of peer address may be included as canonical format (for example, "00:14:bb:11:22:33") identified by colon (:).

iv) Service Information Request

The service information request parameter may include text string for requesting additional information during service information search where the service advertiser is exchanged with the service search request/response frames.

If the text string querying service information request is a substring of a service information set included in the Advertise Service Method, search result event SearchResult Event may be called. For example, a query text string of "ABC" may be matched with service information read as "ABCpdq" or "ABC" among several kinds of service information.

A handle parameter that may be used for cancel service seek method (e.g., CancelSeekService Method) may be returned in response to service seek request method (e.g., ServiceSeek Method).

The service seeker may call the cancel service seek method CancelSeek Method canceling service search. The cancel service seek method may include the handle parameter returned by the service seek method.

Event of Service Advertiser

When a remote device desires to start ASP session for the advertised service, the ASP of the service advertiser may transmit a session request event SessionReqeust Event to the service. At this time, the session request event may be referred to as a service request event ServiceRequest Event in that it initiates start of the service. In more detail, the session request event may be triggered when the ASP of the service advertiser receives the provision discovery request frame or REQUEST_SESSION ASP coordination protocol message. The session request event may include parameters as follows.

i) Advertisement ID

When the Advertise Service Method is called, advertisement ID allocated by the ASP may be included in the session request event.

ii) Session MAC

MAC address of the P2P device to which session ID is allocated may be included in the session request event.

iii) Service Device Name

Device name (in more detail, device name defined by WSC) of the remote device may be included in the session request event.

iv) Session ID

Session ID allocated by a remote ASP may be included in the session request event.

v) Session Information

Service specific data payload may be included in the session request event. Session information may have a length of maximum 144 bytes.

vi) Network Configuration PIN Acquisition (Get_Network_Config_PIN)

If the service advertiser receives the provision discovery request frame together with WSC configuration method (WSC Config method) requesting PIN (Personal Identification Number) for setting up the service network in the service advertiser, the value of the network configuration PIN acquisition parameter may be "True". WSC PIN input by the user may be included in the session confirmation method and then provided to the ASP.

If the service advertiser receives the provision discovery request frame together with WSC configuration method (WSC Config method) that does not request PIN (Personal Identification Number) for setting up the service network in the service advertiser, or if the service request event is triggered by the REQUEST_SESSION ASP coordination protocol message, the value of the network configuration PIN acquisition parameter may be "False".

vii) Network Configuration PIN

If the ASP of the service advertiser receives provision discovery request together with WSC configuration method requesting PIN which will be displayed for setup of the service network, the ASP may generate WSC PIN value, provide the generated WSC PIN value to the service and allow the WSC PIN value to be displayed.

If the ASP of the service advertiser receives provision discovery request together with WSC configuration method that does not request PIN which will be displayed for setup of the service network, or if the service request event is triggered by the REQUEST_SESSION ASP coordination protocol message, the value of the network setup PIN parameter may be '0'.

If the service cannot be advertised any more or advertisement of the service cannot start, an event (e.g., AdvertiseFailed Event) indicating advertisement failure may be transmitted. The event indicating advertisement failure may include advertisement ID and failure reason parameter. Each parameter will be described briefly as follows.

i) Advertisement ID

The advertisement ID may indicate advertisement ID value returned by Advertise Service Method.

ii) Reason

The reason of advertisement failure may indicate any one of the case where the service port is already shared (for example, non-sharing service port has been requested but the corresponding service port is already used as a sharing service port), the case where the service port is already used personally (for example, service port has been requested but the corresponding service port is already used as a personal (dedicated) service port), or other failure reasons.

Event of Service Seeker

When search is being performed, a search result event SearchResult Event indicating a search result for each advertised service discovered from the peer device may be transmitted. The search result event may include at least one of handle, service MAC, advertisement ID, service name, service information and service status parameter. Each parameter will be described as follows.

i) Handle

Handle indicates a value returned by the service seek method.

ii) Service MAC

Service MAC indicates MAC address of the peer device.

iii) Advertisement ID

Advertisement ID indicates advertisement ID defined by the peer device.

iv) Service Name

Service name indicates full service name defined by the peer device.

v) Service Information

Additional service (vendor) specific parameter or NULL text string, which is defined between the service advertiser or the service seeker, is included in the service information.

vi) Service Status

If the service is in the available status, the value of the service status parameter may be set to "Available". If the service supported by the service advertiser is in the unavailable status at the time when the service is supported by the service advertiser, the value of the service status parameter may be set to "Unavailable".

The service seeker may quit the search initiated by the service seek method SeekService Method or transmit search termination event SearchTerminated Event to prevent the search result event from being further generated. The search termination event may include handle and termination reason parameters. Each parameter will be described as follows.

i) Handle

Handle indicates search which is terminated.

ii) Reason

A termination reason of search may be indicated. Timeout or system failure SystemFailure may be indicated as the termination reason of search.

The service seeker may transmit a service request event ServiceRequest Event to start ASP session of the advertised service. The service request event may include at least one of advertisement ID, session MAC, session ID and session information parameter. Each parameter will be described as follows.

i) Advertisement ID

Advertisement ID defined by the peer device may be included in the service request event.

ii) Session MAC

MAC address of the peer device to which session ID is allocated may be included in the service request event.

iii) Session ID

ASP session ID may be included in the service request event.

iv) Session Information

Application specific data payload may be included in the service request event.

Service Search and ASP Session Setup

Based on the aforementioned description, the service search procedure and ASP session setup procedure according to the present invention will be described in more detail.

Figure 13:
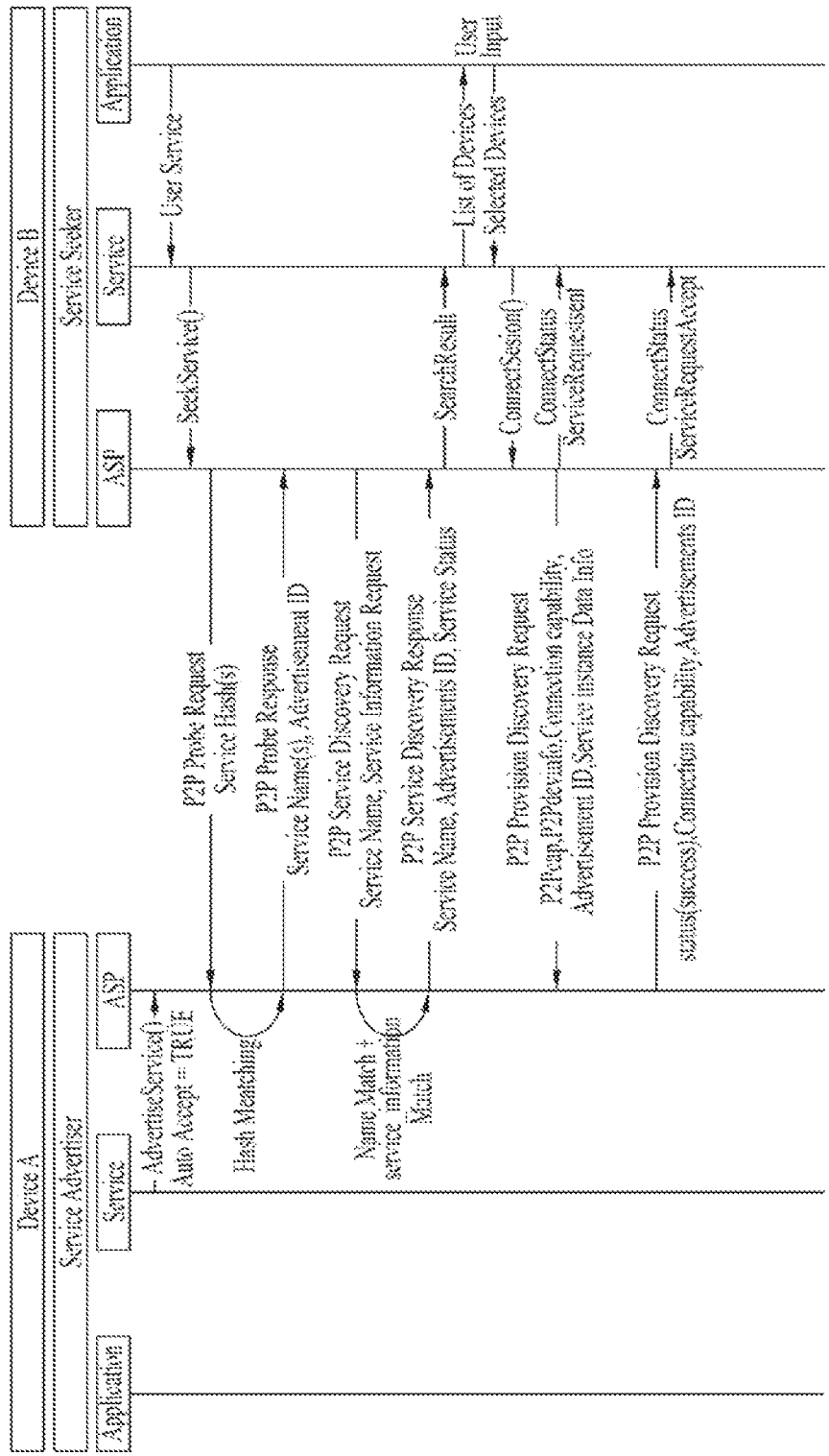
FIGS. 13 to 15 are flow charts illustrating service search and ASP session setup operation.
Figure 14:
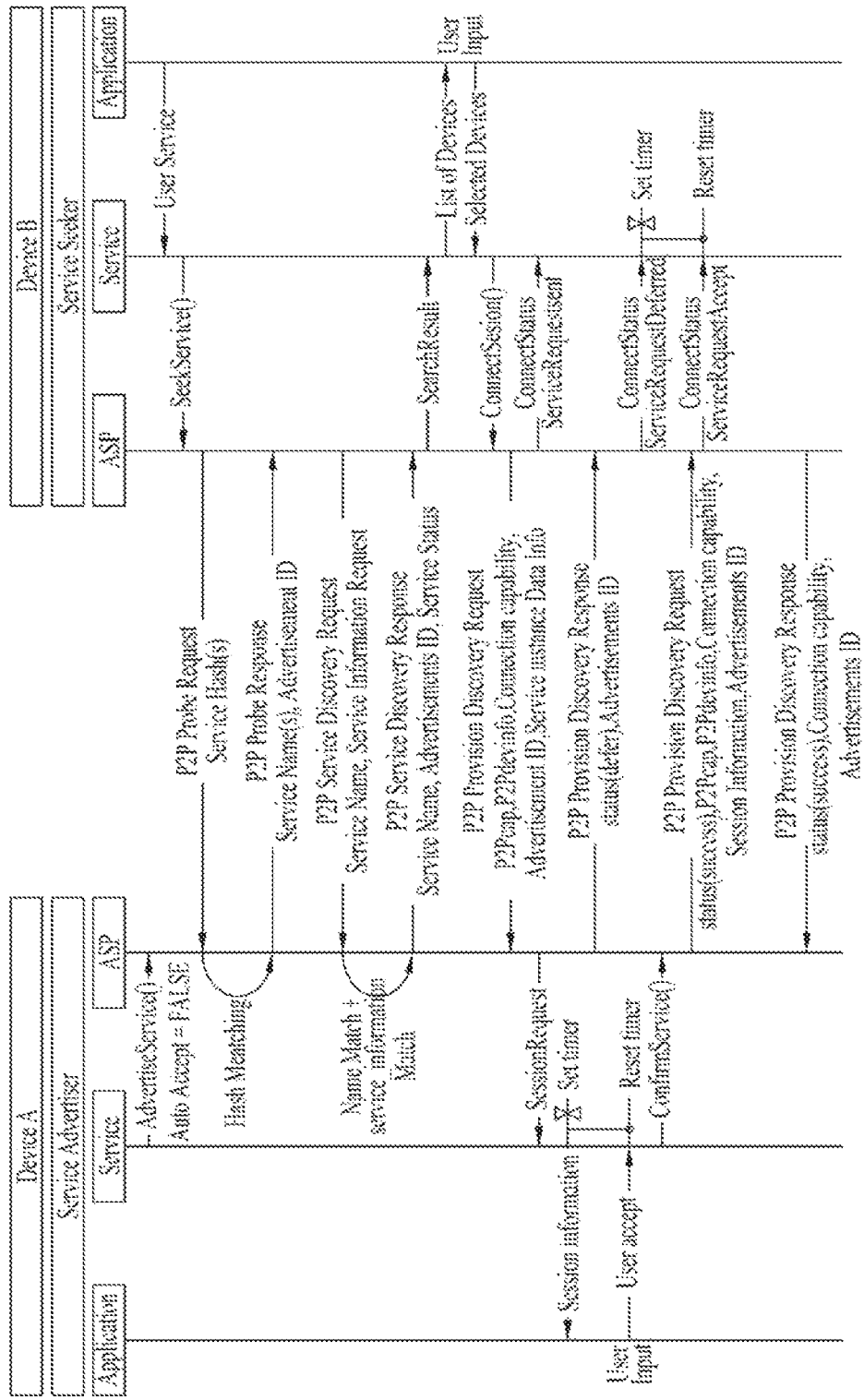
Figure 15:
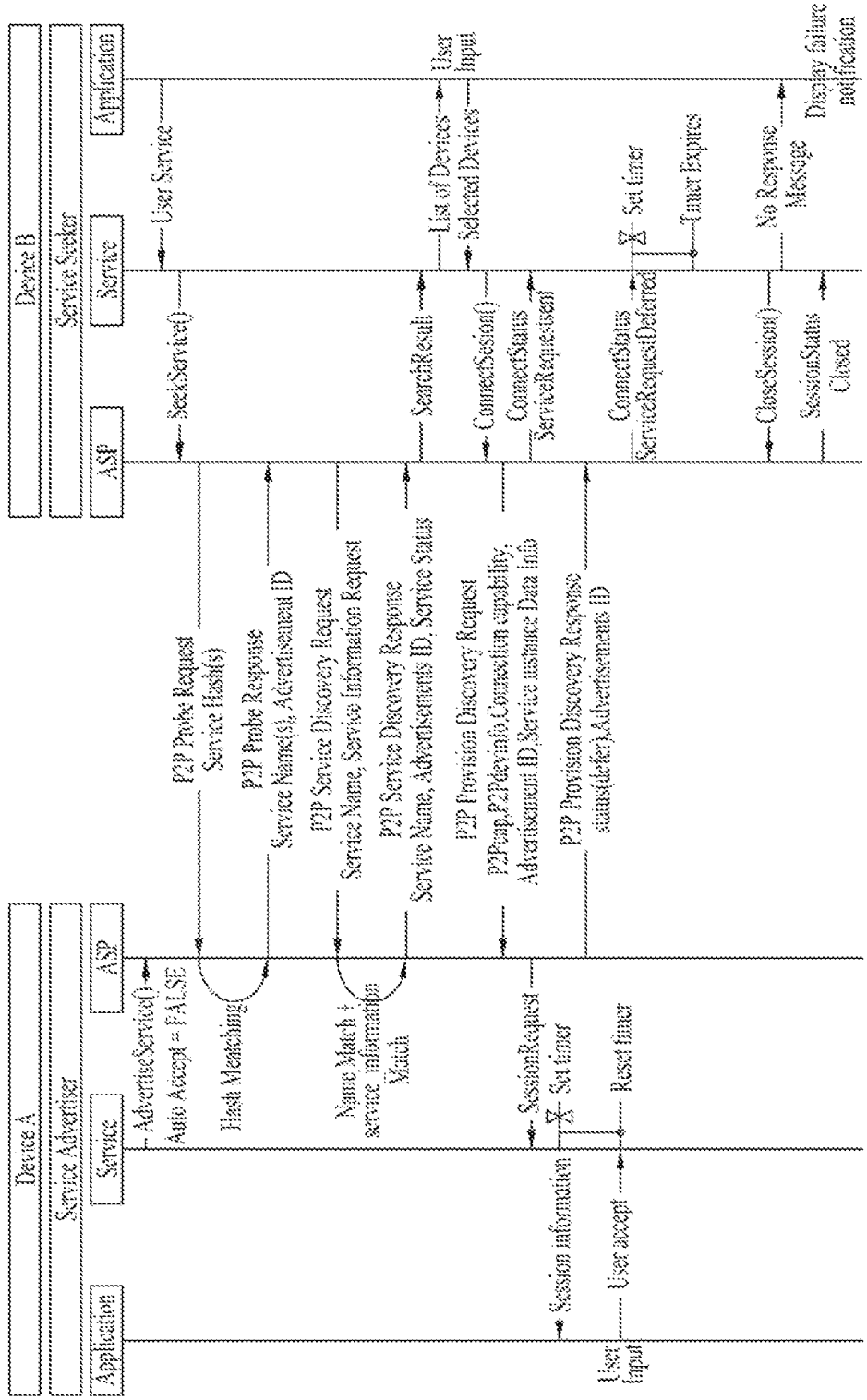

FIGS. 13 to 15 are flow charts illustrating service search and ASP session setup operation. The ASP session setup operation shown in FIGS. 13 to 15 means that a specific service of a random P2P device searches for another P2P device and service, establishes Wi-Fi Direct connection by requesting the service, and an application is operated.

For convenience of description, in FIGS. 13 to 15, it is assumed that device A is operated as a service advertiser for advertising its service and device B is operated as a service seeker for searching for a service.

If the service layer of the device A transmits the Advertise Service Method to the ASP, the ASP of the device A may advertise its service on the basis of information included in the Advertise Service Method and be on standby to allow another device to discover the corresponding service.

If the service layer of the device B transmits the service seek method to the ASP, the ASP of the device B may search for a device, which supports a higher application or a service desired by the user, on the basis of information included in the received service seek method. For example, if the service layer of the device B receives information indicating intention of Use Service from the application layer, the service layer may transfer the service seek method, which includes information on service that requires search, to the ASP.

The ASP of the device B, which has received the service seek method, may transmit the probe request frame to search for the device that supports a desired service. At this time, the probe request frame may include a hash value obtained by converting service name of a service, which is desired to be discovered or may be supported, to a hash form. The hash value is obtained by converting service name or prefix of service name to a hash form through the ASP, and may have a 6 octet length. The probe request frame may be transmitted in the form of broadcast, or may be transmitted in the form of unicast for a specific device.

The device A that has received the probe request frame may attempt hash matching, and if it is determined that a service matched with the hash value included in the probe request frame is supported, the device A may transmit the probe response frame to the device B. At this time, the probe response frame may include at least one of a service name and an advertisement ID field.

At least one of a hash value, an advertisement ID field, and a service notification information field may be included in the probe response frame. The hash value indicates the hash value of the service matched with the hash value requested through the probe request frame, and the advertisement ID field may be a value allocated by the ASP to uniquely identify advertisement of each service in the ASP.

If the device B receives the probe request frame indicating that the service desired to be discovered by the device B is supported, the device B may trigger the service search request frame to search for service information of the device A. At this time, the service search request frame may include a service name field. The service name field may include complete service name to be searched or prefix of service name to be searched.

In this respect, the device A may transmit the service search response frame, which indicates whether the service desired to be discovered by the device B may be provided, to the device B. The service search response frame may include service name, service status, advertisement ID and service information. In this case, the service name may include text string indicating service name of advertised service.

Even though the device A supports the service desired to be discovered by the device B, the device B may not use the service provided by the device A at the time when the service search response frame is transmitted. For example, although the device A supports a Print service searched by itself, if the device A cannot allow association with the peer device any more due to association with maximum available devices, the device B cannot use the service provided by the device A in spite of the fact that the device A supports the service desired to be searched by the device B. Accordingly, the device A according to the present invention may include the service status information, which indicates whether the corresponding service is available at the time when the service search response frame is transmitted, in the service search response frame.

In other words, if the corresponding service is unavailable at the time when the service search response frame is transmitted, the service status information may indicate that the corresponding service is unavailable, whereas the service status information may indicate that the corresponding service is available if the corresponding service is available at the time when the service search response frame is transmitted. The service status information may be an indicator of 1 bit.

The advertisement ID field may be intended to uniquely identify advertisement for each service within the ASP.

The service information field may include optional information that may be shared between the device A which is the service advertiser and the device B which is the service seeker. If service information on the given service (that is, service desired to be discovered by the device B) exists, the service information field may include the hash value transmitted through the probe response frame matched with the given service.

The aforementioned service search request and response frames may be performed using GAS (Generic Advertisement Protocol) defined in the IEEE 802.11u system.

If the operation requested by the service seek method requested from the service layer is completed, the ASP of the device B may notify the application and the user of the result based on the search result event through the service.

At this time, group of Wi-Fi Direct is not formed. If the service provided by the device A may be used and the service calls session connection method ConnectSession Method as the user selects the service of the device A, the provision discovery result may be performed for P2P group formation. The provision discovery request frame and the provision discovery response frame may be exchanged between the device B and the device A. Session information and connection capability information may be exchanged between the devices A and B through exchange between the provision discovery request frame and the provision discovery response frame.

The session information is hint information indicating brief information of the service requested by the device that requests the service. For example, the session information is the information that may allow the other party to determine acceptance/rejection of the service request by indicating the number and size of files if the device desires to request a file transfer service. The connection capability information may be used as information for generating group during group owner (GO) negotiation and P2P invitation.

To this end, the provision discovery request frame may include P2P capability of the device B, P2P device information, connection capability information, and advertisement ID. If session information session information of the session connection method ConnectSession Method called by the service of the device B is not NULL, the provision discovery request frame may further include service instance data that includes session information.

The provision discovery request frame initially transmitted from the service seeker to the service advertiser does not need status information. Even though the status information is included in the provision discovery request frame initially transmitted to the service advertiser, the status information may indicate 'Success'.

If the device B transfers the provision discover request message, which includes connection capability information of the device B, to the device A, the ASP of the device A may determine whether to wait for reception of the session confirmation method SessionConfirm Method depending on a value of an automatic acceptance parameter Auto_Accept.

As illustrated in the example of FIG. 13, if the automatic acceptance parameter is set to TRUE, the ASP of the device A may transfer the provision discovery response frame, which indicates that the status information is 'success', even without session confirmation method. The connection capability information of the device A may be included in the provision discovery response frame indicating that the status information is success. The ASP of the device A may notify the service layer that service request has been accepted, while transferring ConnectStatus Event to the service layer.

By contrast, as illustrated in the example of FIG. 14, if the automatic acceptance parameter is set to False, the ASP of the device A transfers the session request event SessionRequest Event, which includes service information, to the service layer, and the service layer transfers the service information to the application/user. If the application/user decides to accept the corresponding session on the basis of the session information, the service confirmation method is transferred to the APS through the service layer.

At this time, the ASP of the device A transfers the provision discovery response frame to the device B, wherein status information of the provision discovery response frame may be set to 'deferred'. This is to notify that the corresponding service is not accepted immediately and the status waits for input of the user. Accordingly, the ASP of the device B may notify the service layer that service request has been deferred, while transferring ConnectStatus event to the service layer. In this case, the session information included in the service instance data information may be used as a hint for allowing the user to determine acceptance/rejection of the service request.

If the user accepts the service request, the service of the device A transmits the service confirmation method to the ASP. Then, a follow-on provision discovery procedure may be performed. In other words, the device A may transfer the provision discovery request frame to the device B. This may be referred to as the follow-on provision discovery procedure. In the follow-on provision discovery procedure, the provision discovery request frame may include status information, connection capability and advertisement ID. In the follow-on provision discovery procedure, the status information of the provision discovery request frame may indicate success, and the advertisement ID may be set to the value of the advertisement ID included in the provision discovery request frame transmitted from the device B to the device A.

If the provisions search request frame is received from the device A, the ASP of the device B may notify the service layer that the service request has been accepted, while transferring ConnectStatus event to the service layer. Also, the ASP of the device B may transfer the provision discovery response frame to the device A, wherein the provision discovery response frame indicates that the status information is success. At this time, in the follow-on provision discovery procedure, the provision discovery response frame may include status information, connection capability and advertisement ID. In the follow-on provision discovery procedure, the status information of the provision discovery request frame may indicate success.

If the user rejects service request, or if the device A fails to receive user input within a preset time, or if the device B fails to receive the provision discovery request frame from the device A within a predetermined time after transmitting ConnectStatus event indicating that service request has been deferred, ASP session setup between the device A and the device B may be failed.

As illustrated in the example shown in FIG. 15, if ASP session setup between the device A and the device B is failed, the service of the device B may notify the application that there is no response from the other party, and may transmit session close method SessionClose Method to the ASP. The ASP may transmit session status event SessionStatus Event indicating that session has been terminated, to the service.

Hereinafter, based on that the provision discovery procedure between the device A and the device B has been successfully terminated, the P2P group setup procedure between the device A and the device B will be described.

Method for P2P Group Formation

For convenience of description, as illustrated in the example shown in FIG. 13, as the value of the automatic response parameter of the service advertiser is True, the provision discovery procedure for transmitting the provision discovery response frame from the service advertiser immediately in response to the provision discovery request frame will be referred to as 'immediate response case' (or automatic acceptance mode). As illustrated in the example shown in FIG. 14, as the value of the automatic response parameter of the service advertiser is False, the provision discovery procedure followed by the follow-on provision discovery procedure will be referred to as 'delay success case' (or delay mode).

Also, the P2P device that transmits the provision discovery response frame indicating that the status information is success will be referred to as provision discovery (PD) responder or second P2P device. Also, the P2P device that transmits the provision discovery request frame triggering the provision discovery response frame indicating that the status information is success will be referred to as a PD requestor or a first P2P device.

Accordingly, in case of 'immediate response case', the P2P device (device B in FIG. 13) serving as the service seeker may be the first P2P device or PD requestor and the P2P device (device A in FIG. 13) serving as the service advertiser may be the second P2P device or PD responder, whereas in case of 'delay success case', the P2P device (device A in FIG. 14) serving as the service advertiser may be the first P2P device or PD requestor and the P2P device (device B in FIG. 14) serving as the service seeker may be the second P2P device or PD responder.

For setup of the P2P group, the first P2P device may include connection capability of the first P2P device in the provision discovery request frame when transmitting the provision discovery request frame. Connection capability may include a 'New' indicator for indicating whether to newly generate the P2P group, a 'Group Owner (GO)' indicator for indicating whether the device will be operated as a group owner in the P2P group, and a 'Client' indicator for indicating whether the device will be operated as a group client in the P2P group.

In more detail, if the value of the new indicator of connection capability of the first P2P device is 1, it may indicate that the first P2P device desires to create new P2P group through GO negotiation procedure. If not so, the value of the new indicator may be 0. If the value of the group owner indicator of the first P2P device is 1, it may indicate that the first P2P device is the group owner or desires to be the group owner. If not so, the value of the group owner indicator may be 0. If the value of the client indicator of the first P2P device is 1, it may indicate that the first P2P device is the client or desires to be the client. If not so, the value of the client indicator may be 0.

Each of the new indicator, the group owner indicator, and the client indicator may have a size of 1 bit. Table 1 illustrates attribute values of connection capability of the provision discovery request frame based on combination of valid indicators (that is, indicators of which values are 1) of the new indicator, the group owner indicator and the client indicator.

TABLE 1

| New (0x01) | Client (0x02) | GO (0x04) | Connection Capability |
|---|---|---|---|
| 1 | 0 | 0 | 0x01 |
| 0 | 1 | 0 | 0x02 |
| 1 | 1 | 0 | 0x03 |
| 0 | 0 | 1 | 0x04 |
| 1 | 0 | 1 | 0x05 |
| 0 | 1 | 1 | 0x06 |
| 1 | 1 | 1 | 0x07 |

As listed in Table 1, the attribute value 0x01 of connection capability may indicate that connection capability of the first P2P device is new (that is, value of the new indicator is 1), the attribute value 0x02 of connection capability may indicate that connection capability of the first P2P device is client, and the attribute value 0x04 of connection capability may indicate that connection capability of the first P2P device is group owner (that is, value of the group owner indicator is 1).

Connection capability of the first P2P device that transmits the provision discovery request frame may indicate a plurality of indicators of new, client and group owner indicators. For example, the attribute value 0x03 of connection capability may indicate that connection capability of the first P2P device indicates new and client, the attribute value 0x05 of connection capability may indicate that connection capability of the first P2P device indicates new and group owner, and the attribute value 0x06 of connection capability may indicate that connection capability of the first P2P device indicates client and group owner. Also, the attribute value 0x07 of connection capability may indicate that connection capability of the first P2P device indicates all of new, client and group owner.

The second P2P device that has received the provision discovery request frame from the first P2P device may transmit the provision discovery response frame that includes connection capability of the second P2P device. In the same manner as connection capability of the first P2P device, connection capability of the second P2P device may include a 'new' indicator, a 'group owner' indicator and a 'client' indicator.

In more detail, if the value of the new indicator of connection capability of the second P2P device is 1, it may indicate that GO negotiation procedure may be used such that the second P2P device may determine GO at a new P2P group. If not so, the value of the new indicator may be 0. If the value of the group owner indicator of the second P2P device is 1, it may indicate that the first P2P device should join a P2P group of the second P2P device. If not so, the value of the group owner indicator may be 0. If the value of the client indicator of the first P2P device is 1, it may indicate that the second P2P device should join the P2P group of the first device or join the P2P group formed independently by the first P2P device. If not so, the value of the client indicator may be 0.

Table 2 illustrates attribute values of connection capability of the provision discovery response frame based on combination of valid indicators (that is, indicators of which values are 1) of the new indicator, the group owner indicator and the client indicator.

TABLE 2

| New (0x01) | Client (0x02) | GO (0x04) | Connection Capability |
|---|---|---|---|
| 1 | 0 | 0 | 0x01 |
| 0 | 1 | 0 | 0x02 |
| 0 | 0 | 1 | 0x04 |

As listed in Table 2, the attribute value 0x01 of connection capability may indicate that connection capability of the second P2P device is new (that is, value of the new indicator is 1), the attribute value 0x02 of connection capability may indicate that connection capability of the second P2P device is client, and the attribute value 0x04 of connection capability may indicate that connection capability of the second P2P device is group owner (that is, value of the group owner indicator is 1).

Connection capability of the second P2P device that transmits the provision discovery response frame may be set to indicate any one of the new indicator, the client indicator and the group owner indicator unlike the first P2P device.

The first P2P device and the second P2P device may determine whether to initiate GO negotiation procedure and whether to join the P2P group of the other party device, depending on their respective connection capability attribute values.

For example, Table 3 illustrates a method for P2P group formation based on connection capabilities of the first P2P device and the second P2P device.

TABLE 3

| PD Requestor | PD Responder | | |
|---|---|---|---|
| | New (0x01) | Client (0x02) | GO (0x04) |
| New (0x01) | GO Negotiation | Requestor will autonomously start a P2P group by becoming a P2P GO. | Requestor will join Responder's group. If there is no P2P group, Responder will autonomously start a P2P group by becoming a P2P GO. |
| Client (0x02) | Responder will autonomously start a P2P group by becoming a P2P GO. | Fail | Requestor will join Responder's group. If there is no P2P group, Responder will autonomously start a P2P group by becoming a P2P GO. |
| GO (0x04) | Responder will join Requestor's group. If there is no P2P group, Requestor will autonomously start a P2P group by becoming a P2P GO. | Responder will join Requestor's group. If there is no P2P group, Requestor will autonomously start a P2P group by becoming a P2P GO. | Fail |
| New + Client (0x03) | GO Negotiation | Requestor will autonomously start a P2P group by becoming a P2P GO. | Requestor will join Responder's group. If there is no P2P group, Responder will autonomously start a P2P group by becoming a P2P group. |
| New + GO (0x05) | Go Negotiation | Responder will join Requestor's group. If there is no P2P group, Requestor will autonomously start a P2P group by becoming a P2P GO. | Requestor will join Responder's group. If there is no P2P group, Responder will autonomously start a P2P group by becoming a P2P GO. |

TABLE 3-continued

| PD Requestor | PD Responder | | |
|---|---|---|---|
| | New (0x01) | Client (0x02) | GO (0x04) |
| Client + GO (0x06) | Requestor will autonomously start a P2P group by becoming a P2P GO. | Responder will join Requestor's group. If there is no P2P group, Requestor will autonomously start a P2P group by becoming a P2P GO. | Requestor will join Responder's group. If there is no P2P group, Responder will autonomously start a P2P group by becoming a P2P GO. |
| New + Client + GO (0x07) | Go Negotiation | Responder will join Requestor's group. If there is no P2P group, Requestor will autonomously start a P2P group by becoming a P2P GO. | Requestor will join Responder's group. If there is no P2P group, Responder will autonomously start a P2P group by becoming a P2P GO. |

In Table 3, the requestor may mean the first P2P device that transmits the provision discovery (PD) request frame, and the responder may mean the second P2P device that transmits the PD response frame in response to the PD request frame.

As listed in the example of Table 3, if connection capabilities of the first P2P device and the second P2P devices indicate 'new', the first P2P device and the second P2P device may initiate the GO negotiation procedure to form a new P2P group. In more detail, if the connection capability attribute value of the first P2P device is 0x01 (that is, value of the new indicator is '1') and the connection capability attribute value of the second P2P device is also 0x01, the first P2P device and the second P2P device may initiate the GO negotiation procedure.

Figure 16:
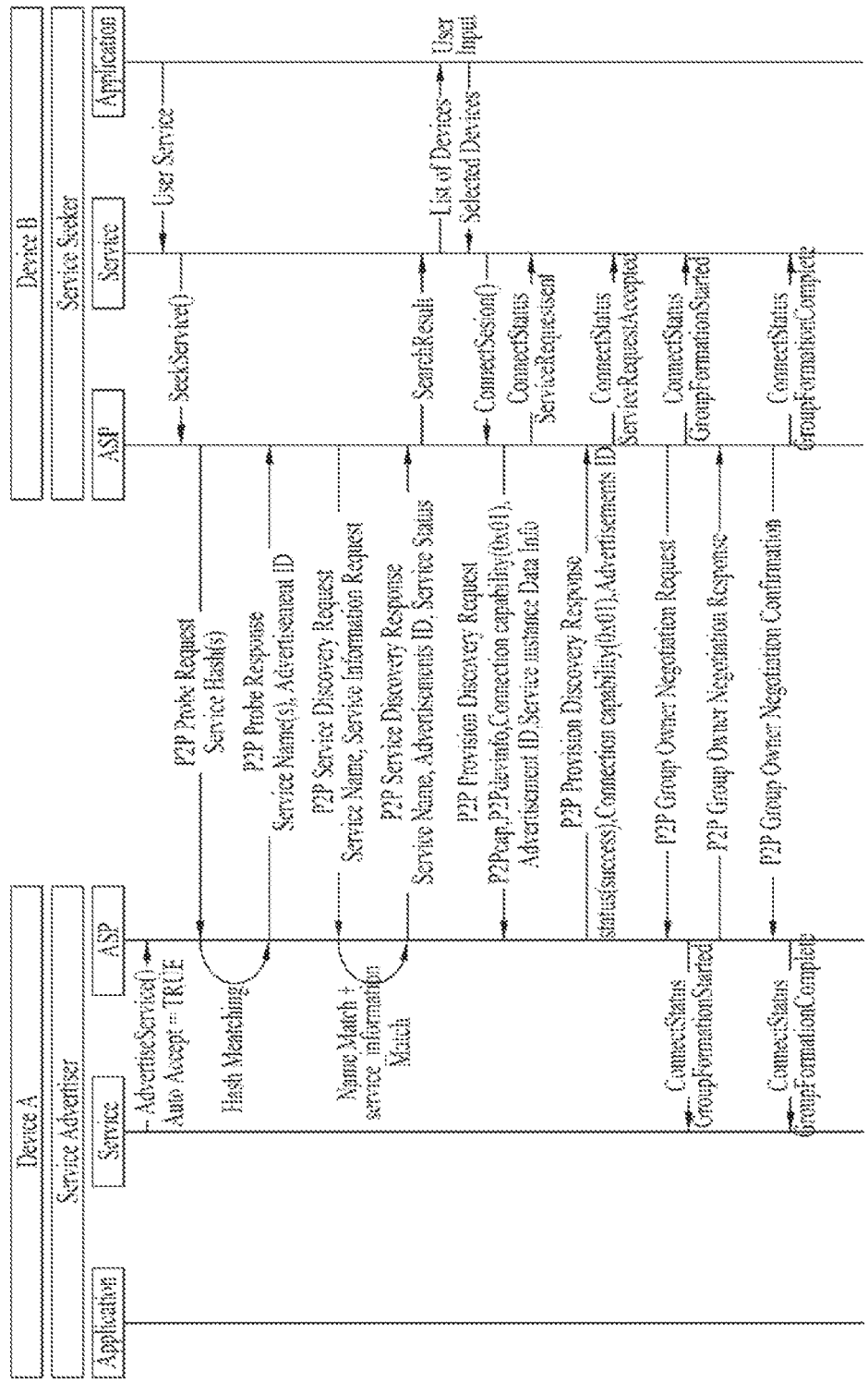
FIGS. 16 and 17 are diagrams examples of initiating GO negotiation between a first P2P device and a second P2P device.
Figure 17:
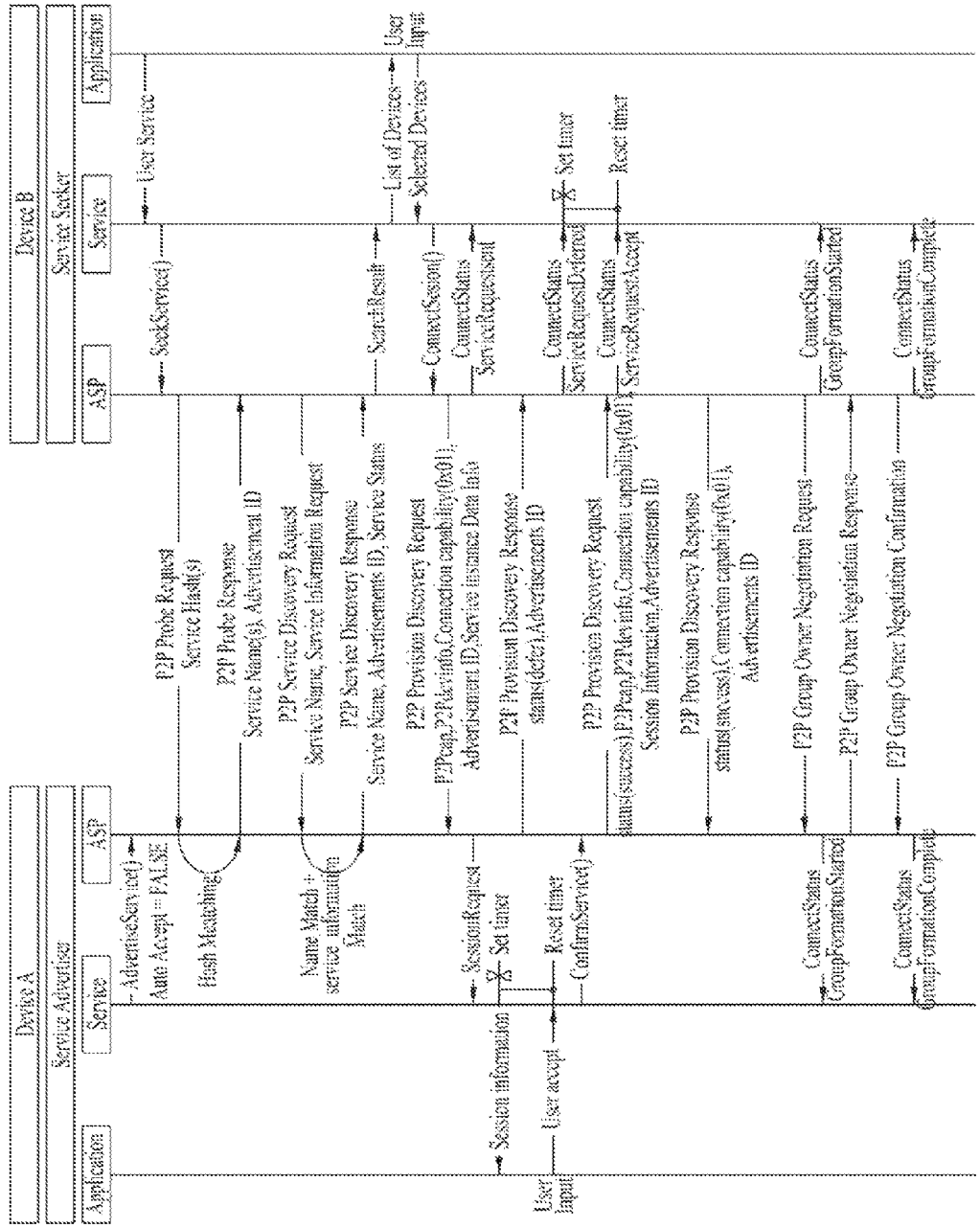

For example, FIGS. 16 and 17 are diagrams examples of initiating GO negotiation between a first P2P device and a second P2P device. FIG. 16 illustrates the immediate response case, and FIG. 17 illustrates the delay response case.

The GO negotiation procedure may be started as any one of the first P2P device and the second P2P device transmits a P2P GO negotiation request frame to the other one. At this time, it is preferable, but not limited, that the P2P GO negotiation request frame is transmitted from the requestor (that is, first P2P device), which has transmitted the PD request frame, to the responder (that is, second P2P device).

For another example, as illustrated in FIGS. 16 and 17, the P2P device operated as the service seeker may be set to transmit the P2P GO negotiation request frame, and although not shown, the P2P device operated as the service advertiser may be set to transmit the P2P GO negotiation request frame.

If any one of connection capabilities of the first P2P device and the second P2P device indicates group owner and the other one indicates client, the P2P device having connection capability indicating client may join the P2P group of the P2P device indicating group owner. In other words, the P2P device indicating group owner may be set to GO in the P2P group, and the P2P device indicating client may be set to client in the P2P group.

If there is no P2P group (specifically, P2P group in which P2P device indicating group owner is group owner) of the P2P device indicating group owner, the P2P device indicating group owner may independently start P2P group as GO. The P2P device having connection capability indicating client may join the P2P group started by the P2P device having connection capability indicating group owner, as the client.

In more detail, if the connection capability attribute value of the first P2P device is 0x02 (that is, value of the client indicator is 1) and the connection capability attribute value of the second P2P device is 0x04 (that is, value of the group owner indicator is 1), the first P2P device may join the P2P group of the second P2P device as the client. If there is no P2P group of the second P2P device, the second P2P device may start the P2P group independently as GO, and the first P2P device may join the P2P group started independently by the second P2P device, as the client.

By contrast, if the connection capability attribute value of the first P2P device is 0x04 (that is, value of the group owner indicator is 1) and the connection capability attribute value of the second P2P device is 0x02 (that is, value of the client indicator is 1), the second P2P device may join the P2P group of the first P2P device as the client. If there is no P2P group of the first P2P device, the first P2P device may start the P2P group independently as GO, and the second P2P device may join the P2P group started independently by the first P2P device, as the client.

For example, FIG. 18 is a diagram illustrating an operation performed when connection capability of a first P2P device indicates a group owner and connection capability of a second P2P device indicates a client.

If connection capability information is exchanged between the first P2P device (device B) and the second P2P device (device A), the first P2P device serving as GO may initiate invitation procedure. In more detail, the first P2P device may transmit an invitation request frame to the second P2P device serving as the client. Also, the ASP of the first P2P device may transmit ConnectStatus event indicating that P2P group formation has been started, to the service.

The second P2P device that has received the invitation request frame from the first P2P device may transmit ConnectStatus event indicating that P2P group formation has been started, to the service, and may transmit an invitation response frame to the first P2P device in response to the invitation request frame. Also, the first P2P device may transmit the ConnectStatus event indicating that group formation has been completed, to the service.

The first P2P device that has received the invitation response frame from the second P2P device may transmit ConnectStatus event indicating that P2P group formation has been completed, to the service, whereby P2P group formation between the first P2P device and the second P2P device may be completed.

Although FIG. 18 illustrates that the first P2P device serves as GO, if the second P2P device serves as GO, the second P2P device may initiate the invitation procedure by transmitting the invitation request frame to the first P2P device.

Although FIG. 18 illustrates that the first P2P device transmits the invitation request frame, the invitation request frame and the invitation response frame may be omitted as the case may be.

In this case, information (for example, identifier of P2P group) on the P2P group to be joined by the second P2P device may be shared between the first P2P device and the second P2P device through the provision request message or the provision response message.

If any one of connection capabilities of the first P2P device and the second P2P device indicates new and the other one indicates client, the P2P device having connection capability indicating new may independently start the P2P group as GO, and the P2P device having connection capability indicating client may join the P2P group started by the P2P device having connection capability indicating new, as the client.

In more detail, if the connection capability attribute value of the first P2P device is 0×01 (that is, value of the new indicator is 1) and the connection capability attribute value of the second P2P device is 0×02 (that is, value of the client indicator is 1), the first P2P device may independently start the P2P group as GO, and the second P2P device may join the P2P group started independently by the first P2P device, as the client.

By contrast, if the connection capability attribute value of the first P2P device is 0×02 (that is, value of the client indicator is 1) and the connection capability attribute value of the second P2P device is 0×01 (that is, value of the new indicator is 1), the second P2P device may start the P2P group independently as GO, and the first P2P device may join the P2P group started independently by the second P2P device, as the client.

If any one of connection capabilities of the first P2P device and the second P2P device indicates new and the other one indicates group owner, the P2P device having connection capability indicating new may join the P2P group of the P2P indicating group owner. In other words, the P2P device indicating group owner may be set to GO in the P2P group, and the P2P device indicating new may be set to client in the P2P group.

If there is no P2P group (specifically, P2P group in which P2P device indicating group owner is group owner) of the P2P device indicating group owner, the P2P device indicating group owner may independently start P2P group as GO, and the P2P device having connection capability indicating new may join the P2P group started by the P2P device having connection capability indicating group owner, as the client.

In more detail, if the connection capability attribute value of the first P2P device is 0×01 (that is, value of the new indicator is 1) and the connection capability attribute value of the second P2P device is 0×04 (that is, value of the group owner indicator is 1), the first P2P device may join the P2P group of the second P2P device as the client. If there is no P2P group of the second P2P device, the second P2P device may independently start the P2P group as GO, and the first P2P device may join the P2P group started independently by the second P2P device as the client.

By contrast, if the connection capability attribute value of the first P2P device is 0×04 (that is, value of the group owner indicator is 1) and the connection capability attribute value of the second P2P device is 0×01 (that is, value of the new indicator is 1), the second P2P device may join the P2P group of the first P2P device as the client. If there is no P2P group of the first P2P device, the first P2P device may independently start the P2P group as GO, and the second P2P device may join the P2P group started independently by the first P2P device as the client.

If connection capabilities of the first P2P device and the second P2P device indicate client only or indicate group owner only, since the roles of GO and client in the P2P device are not clearly identified from each other, P2P group formation between the first P2P device and the second P2P device may be failed.

The connection capability of the first P2P device that transmits the provision discovery request frame may indicate a plurality of indicators of the new indicator, the client indicator and the group owner indicator as described with reference to Table 1.

If the connection capability of the first P2P device indicates both new and client, the operation between the first P2P device and the second P2P device may be the same as that performed when the connection capability of the first P2P device indicates new.

In more detail, if the connection capability attribute value of the first P2P device is 0×03 (that is, values of the new indicator and the client indicator are '1') and the connection capability attribute value of the second P2P device is 0×01 (that is, value of the new indicator is '1'), the first P2P device and the second P2P device may initiate GO negotiation procedure for new P2P group formation in the same manner as the connection capability 0×01 of the first P2P device.

If the connection capability attribute value of the first P2P device is 0×03 (that is, values of the new indicator and the client indicator are '1') and the connection capability attribute value of the second P2P device is 0×02 (that is, value of the client indicator is '1'), the first P2P device may independently start the P2P group as GO and the second P2P device may join the P2P group started independently by the first P2P device as the client, in the same manner as the connection capability 0×01 of the first P2P device.

If the connection capability attribute value of the first P2P device is 0×03 (that is, values of the new indicator and the client indicator are '1') and the connection capability attribute value of the second P2P device is 0×04 (that is, value of the group owner indicator is '1'), the first P2P device may join the P2P group of the second P2P device as the client in the same manner as the connection capability 0×02 (or 0x01) of the first P2P device. If there is no P2P group of the second P2P device, the second P2P device may independently start the P2P group as GO, and the first P2P device may join the P2P group started independently by the second P2P device as the client.

If the connection capability of the first P2P device indicates both new and group owner, the first P2P device and the second P2P device may initiate the GO negotiation procedure, and any one of the first P2P device and the second P2P device may join the P2P group of the other one.

In more detail, if the connection capability attribute value of the first P2P device is 0×05 (that is, values of the new indicator and the group owner indicator are '1') and the connection capability attribute value of the second P2P device is 0×01 (that is, value of the new indicator is '1'), the first P2P device and the second P2P device may initiate the GO negotiation procedure for new P2P group formation in the same manner as the case of the connection capability attribute value 0×01 of the first P2P device.

If the connection capability attribute value of the first P2P device is 0×05 (that is, values of the new indicator and the group owner indicator are '1') and the connection capability attribute value of the second P2P device is 0×02 (that is, value of the client indicator is '1'), the second P2P device may join the P2P group of the first P2P device as the client in the same manner as the case of the connection capability attribute value 0×04 of the first P2P device. If there is no P2P group of the first P2P device, the first P2P device may independently start the P2P group as GO, and the second P2P device may join the P2P group started independently by the first P2P device, as the client.

If the connection capability attribute value of the first P2P device is 0×06 (that is, values of the new indicator and the group owner indicator are '1') and the connection capability attribute value of the second P2P device is 0×04 (that is, value of the group owner indicator is '1'), the first P2P device may join the P2P group of the second P2P device as the client in the same manner as the case of the connection capability attribute value 0×01 of the first P2P device. If there is no P2P group of the second P2P device, the second P2P device may independently start the P2P group as GO, and the first P2P device may join the P2P group started independently by the second P2P device as the client.

If the connection capability of the first P2P device indicates both client and group owner, the first P2P device may be set to GO in the P2P group as far as the connection capability of the second P2P device does not indicates group owner.

In more detail, if the connection capability attribute value of the first P2P device is 0×06 (that is, values of the client indicator and the group owner indicator are '1') and the connection capability attribute value of the second P2P device is 0×01 (that is, value of the new indicator is '1'), the first P2P device may independently start the P2P group as GO, and the second P2P device may join the P2P group started independently by the first P2P device as the client.

If the connection capability attribute value of the first P2P device is 0×06 (that is, values of the client indicator and the group owner indicator are '1') and the connection capability attribute value of the second P2P device is 0×02 (that is, value of the client indicator is '1'), the second P2P device may join the P2P group of the first P2P device as the client in the same manner as the case of the connection capability attribute value 0×04 of the first P2P device. If there is no P2P group of the first P2P device, the first P2P device may independently start the P2P group as GO, and the second P2P device may join the P2P group started independently by the first P2P device, as the client.

If the connection capability attribute value of the first P2P device is 0×06 (that is, values of the client indicator and the group owner indicator are '1') and the connection capability attribute value of the second P2P device is 0×04 (that is, value of the group owner indicator is '1'), the first P2P device may join the P2P group of the second P2P device as the client in the same manner as the case of the connection capability attribute value 0×02 of the first P2P device. If there is no P2P group of the second P2P device, the second P2P device may independently start the P2P group as GO, and the first P2P device may join the P2P group started independently by the second P2P device as the client.

If the connection capability of the first P2P device indicates all of new, client and group owner, the first P2P device and the second P2P device may initiate the GO negotiation procedure, and any one of the first P2P device and the second P2P device may join the P2P group of the other one.

In more detail, if the connection capability attribute value of the first P2P device is 0×07 (that is, values of the new indicator, the client indicator and the group owner indicator are '1') and the connection capability attribute value of the second P2P device is 0×01 (that is, value of the new indicator is '1'), the first P2P device and the second P2P device may initiate the GO negotiation procedure in the same manner as the case of the connection capability attribute value 0×01 of the first P2P device.

If the connection capability attribute value of the first P2P device is 0×07 (that is, values of the new indicator, the client indicator and the group owner indicator are '1') and the connection capability attribute value of the second P2P device is 0×02 (that is, value of the client indicator is '1'), the second P2P device may join the P2P group of the first P2P device as the client in the same manner as the case of the connection capability attribute value 0×04 of the first P2P device. If there is no P2P group of the first P2P device, the first P2P device may independently start the P2P group as GO, and the second P2P device may join the P2P group started independently by the first P2P device, as the client.

If the connection capability attribute value of the first P2P device is 0×07 (that is, values of the new indicator, the client indicator and the group owner indicator are '1') and the connection capability attribute value of the second P2P device is 0×04 (that is, value of the group owner indicator is '1'), the first P2P device may join the P2P group of the second P2P device as the client in the same manner as the case of the connection capability attribute value 0×02 of the first P2P device. If there is no P2P group of the second P2P device, the second P2P device may independently start the P2P group as GO, and the first P2P device may join the P2P group started independently by the second P2P device as the client.

P2P Group Formation Based on Persistent Group

The ASPs of the first P2P device and the second P2P device may select usage of the existing persistent group instead of forming the P2P group or joining the P2P group. To this end, the connection capability of the first P2P device and the connection capability of the second P2P device may further include a persistent group owner (PGO) indicating whether to use the persistent group.

The persistent group (or P2P persistent group) may mean the P2P group formed previously by the first P2P device and the second P2P device. In more detail, if the P2P group is generated between the first P2P device and the second P2P device through initial group negotiation, any one of the first P2P device and the second P2P device serves as the group owner and the other one serves as the group client. Of the first P2P device and the second P2P device, the P2P device which serves as the group owner may generate BSSID and a shared key for access and authentication like access point (AP). At this time, the P2P device may store access information such as the role (for example, group owner or group client) of each P2P device in the P2P group, MAC address of the other party P2P device, ID (for example, BSSID) of the P2P group and a shared key therein. Such access information may be referred to as credential. The P2P device, which stores credential therein, may re-invoke the persistent group on the basis of credential which is previous access information during later configuration and connection of the persistent group.

In more detail, if the P2P persistent group is re-invoked, the P2P device again performs its role performed during previous group formation. In other words, the device serving as the group owner during initial group formation is the persistent group owner, and again serves as the group owner when the P2P persistent group is re-invoked later. In this case, the P2P group may be generated based on the shared key of credential which is previously stored, whereby authentication provisioning may be omitted when the client of the persistent group attempts access.

If the connection capability of the first P2P device indicates PGP (that is, value of PGO indicator is '1'), it may indicate that the persistent group will be re-invoked. If not so, the value of the PGO indicator may be set to '0'.

For example, Table 4 illustrates attribute values of connection capabilities in the provision discovery request frame based on combination of valid indicators (that is, indicators of which value is 1) of the new indicator, the group owner indicator, the client indicator and the PGO indicator.

Table 1 illustrates attribute values of connection capabilities in the provision discovery request frame based on combination of valid indicators (that is, indicators of which value is 1) of the new indicator, the group owner indicator and the client indicator.

TABLE 1

| New (0x01) | Client (0x02) | GO (0x04) | PGO (0x08) | Connection Capability |
|---|---|---|---|---|
| 1 | 0 | 0 | 0 | 0x01 |
| 0 | 1 | 0 | 0 | 0x02 |
| 1 | 1 | 0 | 0 | 0x03 |
| 0 | 0 | 1 | 0 | 0x04 |
| 1 | 0 | 1 | 0 | 0x05 |
| 0 | 1 | 1 | 0 | 0x06 |
| 1 | 1 | 1 | 0 | 0x07 |
| 0 | 0 | 0 | 1 | 0x08 |
| 1 | 0 | 0 | 1 | 0x09 |
| 0 | 1 | 0 | 1 | 0x0A |

As listed in Table 1, the attribute value 0x08 of connection capability may indicate that connection capability of the first P2P device indicates PGO (that is, value of the PGO indicator is 1). Also, the attribute value 0x09 of connection capability may indicate that connection capability of the first P2P device indicates new and PGO, and the attribute value 0x0A of connection capability may indicate that connection capability of the first P2P device indicates client and PGO.

Connection capability of the second P2P device may also indicate PGO. If connection capability of the second P2P device indicates PGO (that is, value of the PGO indicator is '1'), it may indicate that the persistent group will be re-invoked. If not so, the value of the PGO indicator may be set to '0'.

For example, Table 5 illustrates attribute values of connection capabilities in the provision discovery response frame based on combination of valid indicators (that is, indicators of which value is 1) of the new indicator, the group owner indicator and the client indicator.

TABLE 5

| New (0x01) | Client (0x02) | GO (0x04) | PGO (0x08) | Connection Capability |
|---|---|---|---|---|
| 1 | 0 | 0 | 0 | 0x01 |
| 0 | 1 | 0 | 0 | 0x02 |
| 0 | 0 | 1 | 0 | 0x04 |
| 0 | 0 | 0 | 1 | 0x08 |

As listed in Table 5, the attribute value 0x08 of connection capability may indicate that connection capability of the second P2P device indicates PGO (that is, value of the PGO indicator is 1).

Unlike the first P2P device, connection capability of the second P2P device, which transmits the provision discovery response frame, may be set to indicate any one of new, client, group owner and PGO.

The first P2P device and the second P2P device may determine whether to re-invoke the persistent group, initiate GO negotiation procedure, and join the P2P group of the other party device in accordance with their respective connection capability attribute values.

For example, Table 6 illustrates a method for P2P group formation based on connection capabilities of the first P2P device and the second P2P device.

TABLE 6

| Connection Capability of PD Requestor | Description of Connection capability of PD Requestor | Connection Capability of PD Responder | Combination of Connection Capabilities (PD Requestor, PD Responder) |
|---|---|---|---|
| 0x01 (New) | Requestor can become GO of a new group, or become a client | 0x01(New) 0x02(Client) 0x04(GO) 0x08(PGO) | (New, New) (GO, Client) (Client, GO) (Client, PGO) |
| 0x02 (Client) | Requestor can only join a group | 0x04(GO) 0x08(PGO) | (Client, GO) (Client, PGO) |
| 0x04 (GO) | Requestor is a GO and cannot become a client or become GO of an additional group. | 0x02(Client) | (GO, Client) |
| 0x05 (New, GO) | Requestor can become GO of a new group, or become a client. Requestor also has an existing group that can be joined. | 0x01(New) 0x02(Client) 0x04(GO) 0x08(PGO) | (New, New) (GO, Client) (Client, GO) (Client, PGO) |
| 0x06 (Client, GO) | Requestor has an existing group that can be joined. Requestor can become a client | 0x02(Client) 0x04(GO) 0x08(PGO) | (GO, Client) (Client, GO) (Client, PGO) |
| 0x08 (PGO) | Requestor is a GO of persistent group and cannot become a client or become GO of an additional group | 0x02(Client) | (PGO, Client) |
| 0x09 (New, PGO) | Requestor can become GO of a new group, or become a client. Requestor also has a persistent group that can be joined. | 0x01(New) 0x02(Client) 0x04(GO) 0x08(PGO) | (New, New) (PGO, Client) (Client, GO) (Client, PGO) |
| 0x0A (Client, PGO) | Requestor has a persistent group that can be joined. Requestor can become a client of group | 0x02(Client) 0x04(GO) 0x08(PGO) | (PGO, Client) (Client GO) (Client, PGO) |

At least a part of various instances listed in Table 6 may interpret the operation of the first P2P device (that is, PD requestor) and the second P2P device (that is, PD responder) with reference to Table 3. In more detail, among combinations of connection capabilities of the first P2P device and the second P2P device, combinations (New, New), (Client, GO) and (Go, Client) may be interpreted with reference to Table 3.

In more detail, in Table 6, combination (New, New) (for example, the case where the attribute value of connection capability of the first P2P device is 0x01 and the attribute value of connection capability of the second P2P device is 0x01, the case where the attribute value of connection capability of the first P2P device is 0x05 and the attribute value of connection capability of the second P2P device is 0x01, the case where the attribute value of connection capability of the first P2P device is 0x09 and the attribute value of connection capability of the second P2P device is 0x01, etc.) may mean that the operation when the attribute value of connection capability of the first P2P device is 0x01 and the attribute value of connection capability of the second P2P device is 0x01 in Table 3 is generated. In other words, this combination may mean that the GO negotiation procedure may be initiated between the first P2P device and the second P2P device.

Also, in Table 6, combination (Client, GO) (for example, the case where the attribute value of connection capability of the first P2P device is 0x01 and the attribute value of connection capability of the second P2P device is 0x04, the case where the attribute value of connection capability of the first P2P device is 0x02 and the attribute value of connection capability of the second P2P device is 0x04, the case where the attribute value of connection capability of the first P2P device is 0x05 and the attribute value of connection capability of the second P2P device is 0x04, the case where the attribute value of connection capability of the first P2P device is 0x06 and the attribute value of connection capability of the second P2P device is 0x04, the case where the attribute value of connection capability of the first P2P device is 0x09 and the attribute value of connection capability of the second P2P device is 0x04, the case where the attribute value of connection capability of the first P2P device is 0x0A and the attribute value of connection capability of the second P2P device is 0x04,etc.) may mean that the operation when the attribute value of connection capability of the first P2P device is 0x02 and the attribute value of connection capability of the second P2P device is 0x04 in Table 3 is generated. In other words, this combination may mean that the first P2P device may join the P2P group of the second P2P device or join the P2P group, which is started independently by the second P2P device as GO, as the client.

Also, in Table 6, combination (GO, Client) (for example, the case where the attribute value of connection capability of the first P2P device is 0x01 and the attribute value of connection capability of the second P2P device is 0x02, the case where the attribute value of connection capability of the first P2P device is 0x04 and the attribute value of connection capability of the second P2P device is 0x02, the case where the attribute value of connection capability of the first P2P device is 0x05 and the attribute value of connection capability of the second P2P device is 0x02, the case where the attribute value of connection capability of the first P2P device is 0x06 and the attribute value of connection capability of the second P2P device is 0x02, etc.) may mean that the operation when the attribute value of connection capability of the first P2P device is 0x04 and the attribute value of connection capability of the second P2P device is 0x04 in Table 3 is generated. In other words, this combination may mean that the second P2P device may join the P2P group of the first P2P device or join the P2P group, which is started independently by the first P2P device as GO, as the client.

Also, in Table 6, combination (PGO, Client) (for example, the case where the attribute value of connection capability of the first P2P device is 0x08 and the attribute value of connection capability of the second P2P device is 0x02, the case where the attribute value of connection capability of the first P2P device is 0x09 and the attribute value of connection capability of the second P2P device is 0x02, the case where the attribute value of connection capability of the first P2P device is 0x0A and the attribute value of connection capability of the second P2P device is 0x02, and combination (Client, PGO) (for example, the case where the attribute value of connection capability of the first P2P device is 0x01 and the attribute value of connection capability of the second P2P device is 0x08, the case where the attribute value of connection capability of the first P2P device is 0x02 and the attribute value of connection capability of the second P2P device is 0x08, the case where the attribute value of connection capability of the first P2P device is 0x06 and the attribute value of connection capability of the second P2P device is 0x08, the case where the attribute value of connection capability of the first P2P device is 0x09 and the attribute value of connection capability of the second P2P device is 0x08, the case where the attribute value of connection capability of the first P2P device is 0x0A and the attribute value of connection capability of the second P2P device is 0x08, etc.) may mean that any one of the first P2P device and the second P2P device, which has connection capability of client, joins the persistent group of the other one having connection capability of PGO as the client.

For example, if the first P2P device performs the role of PGO and the second P2P device performs the role of client, the first P2P device may be set to group owner of the persistent group, and the second P2P device may join the persistent group as the client.

In combination (Client, GO) or combination (GO, Client), if the P2P device, which performs the role of GO, does not have P2P group after successful provision discovery (PD) procedure, the P2P device may become GO independently and then start the P2P group. In this case, the P2P device, which performs the role of client, should perform provisioning procedure to join the P2P group started independently by the P2P device that performs the role of GO.

Unlike this, in combination (Client, PGO) or combination (PGO, Client), if the P2P device, which performs the role of client, caches credential information on the persistent group, the P2P device may directly perform association procedure without provisioning procedure. If the P2P device, which performs the role of client, does not cache credential information on the persistent group, the P2P device should perform provisioning procedure to join the persistent group in the same manner as the combination (Client, GO).

Structures of Provision Discovery Request Frame and Provision Discovery Response Frame The provision discovery procedure is a main procedure before setup of P2P connection for ASP session. Through the provision discovery procedure, network role (GO or client) of each P2P device may be identified, and various parameters such as operating channel may be determined through network role of each P2P device. The provision discovery procedure may be defined by the automatic acceptance mode and the delay mode followed by the follow-on provision discovery procedure as described above.

Table 7 illustrates formats of the provision discovery request frame and the provision discovery response frame in the automatic acceptance mode.

TABLE 7

| Attribute ID | Attribute | Provision Discovery Request | Provision Discovery Response |
|---|---|---|---|
| 2 | P2P Capability | Always Present | Always Present |
| 13 | P2P Device Info | Always Present | Always Present |
| 15 | P2P Group ID | Connection Capability Info indicates New or GO or (New, GO) or (Client, GO) or (PGO) or (New, PGO) or (Client, PGO) | Connection Capability Info indicates GO or PGO |
| 0 | Status | | Always Present |
| 17 | Operating Channel | Connection Capability Info indicates New or GO or (New, GO) or (Client, GO) or (PGO) or (New, PGO) or (Client, PGO) | Connection Capability Info indicates GO or PGO |
| 11 | Channel List | Connection Capability Info indicates New or (New, GO) or (New, PGO) | Connection Capability Info indicates Client or GO or PGO |
| 22 | Service Instance Data Info | Always Present | — |
| 23 | Connection Capability Info | Always Present | Present in the Provision Discovery Response if Status = Success. |

TABLE 7-continued

| Attribute ID | Attribute | Provision Discovery Request | Provision Discovery Response |
|---|---|---|---|
| 24 | Advertisement ID Info | Always Present | Always Present |
| 5 | Configuration Timeout | Connection Capability Info indicates New or (New, GO) or (GO, Client) or (New, PGO) or (PGO, Client) | Connection Capability Info indicates GO or Client or PGO |
| 6 | Listen Channel | Connection Capability Info indicates New or Client | — |
| 26 | Session ID Info | Always Present | — |

The attributes included in the provision discovery request frame will be described. First of all, the P2P group ID attribute indicates identification information of the P2P group which will be joined by the PD requestor. The P2P group ID attribute may be present in the provision discovery request frame only when connection capability of the PD requestor indicates New, GO, (New, GO), (Client, GO), PGO, (New, PGO), or (Client, PGO).

The operating channel attribute of the provision discovery request frame may indicate an intended or current operating channel of the P2P group which is expected to be joined by the P2P device. The operating channel attribute may be included in the provision discovery request frame only when connection capability of the PD requestor indicates New, GO, (New, GO), (Client, GO), PGO, (New, PGO), or (Client, PGO).

The channel list attribute of the provision discovery request frame indicates a channel that may be supported by the ASP of the P2P device, which becomes a group owner of the P2P group, as an operating channel of the P2P group. The channel indicated by the operating channel attribute may be any one of the channels of the channel list attribute. The channel list attribute may be included in the provision discovery request frame only when connection capability of the PD requestor is New, (New, GO), or (New, PGO).

The connection capability information attribute indicates connection capability of the PD requestor. Connection capability of the PD requestor may indicate any one of New, Go, Client and PGO.

The advertisement ID information attribute indicates advertisement ID of a service which is intended to be used. The advertisement ID may be allocated to the ASP of the service advertiser.

The configuration timeout attribute of the provision discovery request frame indicates maximum time that may be used by the ASP to start the provisioning procedure if a new P2P group is generated as a result of connection capability exchange through the provision discovery procedure. The configuration timeout attribute may be included in the provision discovery request frame only when connection capability of the PD requestor indicates New, (New, GO), (GO, Client), (New, PGO), or (PGO, Client).

The listen channel attribute of the provision discovery request frame may indicate a channel that should be monitored by the ASP and the P2P device corresponding to the ASP after the ASP and the P2P device corresponding to the ASP receives the provision discovery response frame of which status information is 'fail' (or 'defer'). The listen channel attribute may be included in the provision discovery request frame only when connection capability of the PD requestor indicates New or Client.

Next, the attributes included in the provision discovery response frame will be described. First of all, the P2P group ID attribute indicates identification information of the P2P group which will be joined by the PD requestor. The P2P group ID attribute may be included in the provision discovery response frame only when connection capability of the PD responder indicates GO or PGO.

The operating channel attribute of the provision discovery response frame may indicate an intended or current operating channel of the P2P group which is expected to be joined by the P2P device. The operating channel attribute may be included in the provision discovery response frame only when connection capability of the PD responder indicates GO or PGO.

The channel list attribute of the provision discovery response frame may include a subset of a channel list provided through the provision discovery request frame. The channel indicated in the operating channel attribute may be any one of channels in the channel list attributed. The channel list attribute may be included in the provision discovery response frame only when connection capability of the PD responder indicates Client, GO, or PGO.

The connection capability information attribute of the provision discovery request frame indicates connection capability of the PD responder. The connection capability information attribute may be included in the provision capability response frame only when a value of the status attribute indicates Success.

The advertisement ID information attribute of the provision discovery request frame indicates advertisement ID of a service which is intended to be used. The advertisement ID may be allocated to the ASP of the service advertiser.

The configuration timeout attribute of the provision discovery request frame indicates maximum time that may be used by the ASP to start the provisioning procedure if a new P2P group is generated as a result of connection capability exchange through the provision discovery procedure. The configuration timeout attribute may be included in the provision discovery request frame only when connection capability of the PD responder indicates GO, Client or PGO.

The status attribute may be included in the provision discovery request frame. If a common channel supported by the ASP is not present, a status code (for example, "Fail; no common channels") indicating 'fail' due to no common channel may be included in the status attribute.

If the ASP receives the provision discovery request frame of another advertisement ID in a state that the ASP has already started the provision discovery procedure, a status code (for example, "Fail; unable to accommodate request") indicating 'fail' due to non-acceptance of request may be included in the status attribute.

If the automatic acceptance parameter of the advertisement service method AdvertiseService Method is "False", a status code (for example, "Fail; information is currently unavailable") indicating 'fail' due to currently unavailable information may be included in the status attribute. Also, the ASP may transmit session request event SessionRequest Event to the upper layer (that is, service layer) and start a timer of a preset time (for example, 120 seconds). If the preset time expires, the provision discovery procedure may be regarded as failed, and P2P connection setup may be stopped.

If the ASP receives session confirmation method ConfirmSession Method of which a confirmed parameter has a value of True or False, from the service, the ASP may stop the timer, and may transmit the follow-on provision discovery request frame to the other party P2P device through the channel (channel indicated by the operating channel attribute if the listen channel attribute is not included in the provision discovery request frame) indicated by the listen channel attribute.

In more detail, if the value of the confirmed parameter of the session confirmation method is True, a status code (for example, "Success; Accepted by user") indicating success due to acceptance by the user may be included in the status attribute. Unlike this, if the value of the confirmed parameter of the session confirmation method is False, a status code (for example, "Fail; Rejected by user") indicating fail due to rejection by the user may be included in the status attribute.

The session ID information attribute, the advertisement ID information attribute, the listen channel attribute and the operating channel attribute in the provision discovery response frame may have the same values as those in the provision discovery request frame.

Table 8 illustrates formats of the provision discovery request frame and the provision discovery response frame in the delay mode.

TABLE 8

| Attribute ID | Attribute | Follow-on Provision Discovery Request | Follow-on Provision Discovery Response |
|---|---|---|---|
| 2 | P2P Capability | Always Present | Always Present |
| 13 | P2P Device Info | Always Present | Always Present |
| 15 | P2P Group ID | Connection Capability Info indicates New or GO or (New, GO) or (Client, GO) or PGO or (New, PGO) or (Client, PGO) | Connection Capability Info indicates GO or PGO |
| 0 | Status | Always Present | Always Present |
| 17 | Operating Channel | Connection Capability Info indicates New or GO or (New, GO) or (Client, GO) or PGO or (New, PGO) or (Client, PGO) | Connection Capability Info indicates GO or PGO |
| 11 | Channel List | Connection Capability Info indicates New or (New, GO) or (New, PGO) | Connection Capability Info indicates Client or GO or PGO |
| 22 | Service Instance Data Info | — | — |
| 23 | Connection Capability Info | Present if Status == "Success: Accepted by user" | Always Present |
| 24 | Advertisement ID Info | Always Present | Always Present |
| 5 | Configuration Timeout | Connection Capability Info indicates New or (New GO) or (GO, Client) or (New, PGO), (PGO, Client) | Connection Capability Info indicates GO or Client or PGO |
| 6 | Listen Channel | Connection Capability Info indicates New or Client | — |
| 26 | Session ID Info | Always Present | — |

The follow-on provision discovery request frame in the delay mode may always include the status attribute unlike the provision discovery request frame in the automatic acceptance mode.

The follow-on provision discovery response frame in the delay mode may be transmitted only if the status attribute of the follow-on provision discovery request frame indicates success (for example, the status attribute includes status code indicating "Success; Accepted by user").

Although the exemplary method of the present invention, which is described in the aforementioned embodiments, is expressed as a series of operations for concise description, respective steps of the operations are not intended to limit their order, and may be performed at the same time or in a different order if necessary. Also, it is to be understood that all steps illustrated in the drawings are not required necessarily to realize the method suggested in the present invention.

Also, the method according to the present invention may be implemented in such a manner that the aforementioned various embodiments of the present invention may independently be applied thereto, or two or more embodiments may simultaneously be applied thereto.

FIG. 19 is a block diagram illustrating a wireless device according to one embodiment of the present invention.

The wireless device 10 may include a processor 11, a memory 12, and a transceiver 13. The transceiver 13 may transmit and receive a radio signal, and for example, may implement a physical layer according to the IEEE 802 system. The processor 11 may electrically be connected with the transceiver 13 to implement the physical layer and/or MAC layer according to the IEEE 802 system. Also, the processor 11 may be configured to perform one or more operations of application, service and ASP layers according to the aforementioned various embodiments of the present invention. Also, a module for implementing the operation of the wireless device according to the aforementioned various embodiments of the present invention may be stored in the memory 12, and may be implemented by the processor 11. The memory 12 may be included inside or outside the processor 11, and may be connected with the processor 11 by a well known means.

The detailed configuration of the wireless device of FIG. 19 may be implemented in such a manner that the aforementioned various embodiments of the present invention may independently be applied thereto, or two or more embodiments may simultaneously be applied thereto. The repeated description of the detailed configuration of the wireless device of FIG. 19 will be omitted for clarification.

The embodiments according to the present invention may be implemented by various means, for example, hardware, firmware, software, or their combination.

If the embodiments according to the present invention are implemented by hardware, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the embodiments of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although the aforementioned embodiments according to the present invention have been described based on the IEEE 802.11 system, the embodiments may equally be applied to various wireless communication systems.

What is claimed is:

1. A method for peer to peer, P2P, group formation performed in a first wireless device supporting Wi-Fi Direct service, the method comprising:
    transmitting a provision discovery request frame including connection capabilities of the first wireless device, to a second wireless device based on a provision discovery procedure;
    receiving a provision discovery response frame including connection capabilities of the second wireless device, from the second wireless device based on a provision discovery procedure; and
    determining whether to re-use or create a P2P group and a group owner of the P2P group on the basis of the connection capabilities included in the provision discovery request frame and the provision discovery response frame,
    wherein the first wireless device is a service seeker and the second wireless device is a service advertiser when the provision discovery procedure is an immediate response case, and
    wherein the first wireless device is a service advertiser and the second wireless device is a service seeker when the provision discovery procedure is a delayed response case.

2. The method according to claim 1, wherein the connection capabilities of each of the first and second wireless devices indicate at least one of operation modes comprising New for initiating a new P2P group, Group Owner for becoming a group owner, and Client for becoming a client.

3. The method according to claim 1, wherein any one of the first wireless device and the second wireless device, which has the role of a group owner, becomes the group owner and generates the P2P group autonomously if its P2P group does not exist.

4. The method according to claim 2, wherein, if the connection capabilities of the first wireless device and the connection capabilities of the second wireless device both indicate New, the first wireless device initiates a group owner negotiation procedure with the second wireless device for determining a group owner in the P2P group.

5. The method according to claim 4, wherein the group owner negotiation procedure is started as the first wireless device, which has transmitted the provision discovery request frame, transmits a P2P group owner negotiation request frame to the second wireless device.

6. The method according to claim 2, wherein, if the connection capabilities of any one of the first wireless device and the second wireless device indicate New and the connection capabilities of the other one indicate Client, any one of the first wireless device and the second wireless device, which has the connection capabilities indicating New, is set to the group owner in the P2P group, and the other one having the connection capabilities indicating Client joins the P2P group.

7. The method according to claim 2, wherein, if the connection capabilities of any one of the first wireless device and the second wireless device indicate Group Owner and the connection capabilities of the other one indicate Client, any one of the first wireless device and the second wireless device, which has the connection capabilities indicating Group Owner, is set to the group owner in the P2P group, and the other one having the connection capabilities indicating Client joins the P2P group.

8. The method according to claim 2, wherein the connection capabilities of the first wireless device indicate one or more of New, Group Owner and Client, whereas the connection capabilities of the second wireless device indicate only one of New, Group Owner and Client.

9. The method according to claim 2, wherein, if the connection capabilities of the first wireless device indicate both Group Owner and Client, the first wireless device is set to the group owner in the P2P group when the connection capabilities of the second wireless device indicate New or Client, and the first wireless device joins a P2P group formed by the second wireless device as a group owner when the connection capabilities of the second wireless device indicate Group Owner.

10. The method according to claim 2, wherein, if the connection capabilities of the first wireless device indicate New and at the same time further indicate at least one of Group Owner and Client, the first wireless device initiates a group owner negotiation procedure with the second wireless device for determining a group owner in the P2P group when the connection capabilities of the second wireless device indicate New, the first wireless device is set to the group owner in the P2P group when the connection capabilities of the second wireless device indicate Group Client, and the first wireless device is set to join a P2P group formed by the second wireless device as a group owner when the connection capabilities of the second wireless device indicate Group Owner.

11. The method according to claim 2, wherein the operation modes further includes Persistent Group Owner for indicating reuse of an existing persistent group.

12. The method according to claim 11, wherein, if the connection capabilities of any one of the first wireless device and the second wireless device indicate Persistent Group Owner and the connection capabilities of the other one indicate New, any one of the first wireless device and the second wireless device, which has the connection capabilities indicating the Persistent Group Owner, is set to a group owner of the new P2P group, and the other one which has the connection capabilities indicating New joins the new P2P group.

13. The method according to claim 11, wherein, if the connection capabilities of any one of the first wireless device and the second wireless device indicate the Persistent Group Owner and the connection capabilities of the other one indicate Client, any one of the first wireless device and the second wireless device, which has the connection capabilities indicating the Persistent Group Owner, is set to a group owner in the persistent group, and the other one which has the connection capabilities indicating Client joins the persistent group.

14. The method according to claim 13, wherein, if any one of the first wireless device and the second wireless device, which has the connection capabilities indicating Client, caches credential information on the persistent group, a provisioning procedure between the first wireless device and the second wireless device is omitted.

15. A first wireless device for P2P group formation supporting Wi-Fi Direct service, the first wireless device comprising:
    a transceiver; and
    a processor,
    wherein the processor is configured to
    control the transceiver to transmit a provision discovery request frame including connection capabilities of the first wireless device, to a second wireless device based on a provision discovery procedure, and control the transceiver to receive a provision discovery response frame including connection capabilities of the second wireless device, from the second wireless device based on the provision discovery procedure, and determine whether to re-use or create a P2P group and a group owner of the P2P group on the basis of the connection capabilities included in the provision discovery request frame and the provision discovery response frame, wherein the first wireless device is a service seeker and the second wireless device is a service advertiser when the provision discovery procedure is an immediate response case, and wherein the first wireless device is a service advertiser and the second wireless device is a service seeker when the provision discovery procedure is a delayed response case.

* * * * *